US012293229B2

(12) United States Patent
Sun et al.

(10) Patent No.: US 12,293,229 B2
(45) Date of Patent: May 6, 2025

(54) ARTIFICIAL INTELLIGENCE ACCELERATOR DEVICE

(71) Applicant: Taiwan Semiconductor Manufacturing Company, Ltd., Hsinchu (TW)

(72) Inventors: Xiaoyu Sun, San Jose, CA (US); Xiaochen Peng, San Jose, CA (US); Murat Kerem Akarvardar, Hsinchu (TW)

(73) Assignee: Taiwan Semiconductor Manufacturing Company, Ltd., Hsinchu (TW)

( * ) Notice: Subject to any disclaimer, the term of this patent is extended or adjusted under 35 U.S.C. 154(b) by 96 days.

(21) Appl. No.: 17/900,471

(22) Filed: Aug. 31, 2022

(65) Prior Publication Data

US 2024/0069971 A1 Feb. 29, 2024

(51) Int. Cl.
*G06F 15/80* (2006.01)
*G06F 7/50* (2006.01)
*G06F 9/50* (2006.01)

(52) U.S. Cl.
CPC .............. *G06F 9/5027* (2013.01); *G06F 7/50* (2013.01); *G06F 15/80* (2013.01)

(58) Field of Classification Search
None
See application file for complete search history.

(56) References Cited

U.S. PATENT DOCUMENTS

| | | | | |
|---|---|---|---|---|
| 5,014,235 A | * | 5/1991 | Morton | G06F 17/16 365/185.11 |
| 10,521,488 B1 | * | 12/2019 | Ross | G06F 15/8046 |
| 11,157,287 B2 | | 10/2021 | Talpes et al. | |
| 11,275,997 B1 | * | 3/2022 | Vantrease | G06N 3/045 |
| 11,581,039 B2 | | 2/2023 | Khwa et al. | |
| 11,803,736 B1 | * | 10/2023 | Meyer | G06F 9/3013 |
| 2019/0026078 A1 | * | 1/2019 | Bannon | G06F 7/5443 |
| 2019/0026237 A1 | * | 1/2019 | Talpes | G06N 3/063 |
| 2019/0080239 A1 | * | 3/2019 | Yang | G06N 3/063 |
| 2021/0124794 A1 | * | 4/2021 | Nair | G06F 17/153 |

FOREIGN PATENT DOCUMENTS

| | | |
|---|---|---|
| CN | 114550790 A | 5/2022 |
| CN | 114723028 A | 7/2022 |

* cited by examiner

*Primary Examiner* — Michael Sun
(74) *Attorney, Agent, or Firm* — Harrity & Harrity, LLP

(57) ABSTRACT

An artificial intelligence (AI) accelerator device may include a plurality of on-chip mini buffers that are associated with a processing element (PE) array. Each mini buffer is associated with a subset of rows or a subset of columns of the PE array. Partitioning an on-chip buffer of the AI accelerator device into the mini buffers described herein may reduce the size and complexity of the on-chip buffer. The reduced size of the on-chip buffer may reduce the wire routing complexity of the on-chip buffer, which may reduce latency and may reduce access energy for the AI accelerator device. This may increase the operating efficiency and/or may increase the performance of the AI accelerator device. Moreover, the mini buffers may increase the overall bandwidth that is available for the mini buffers to transfer data to and from the PE array.

20 Claims, 22 Drawing Sheets

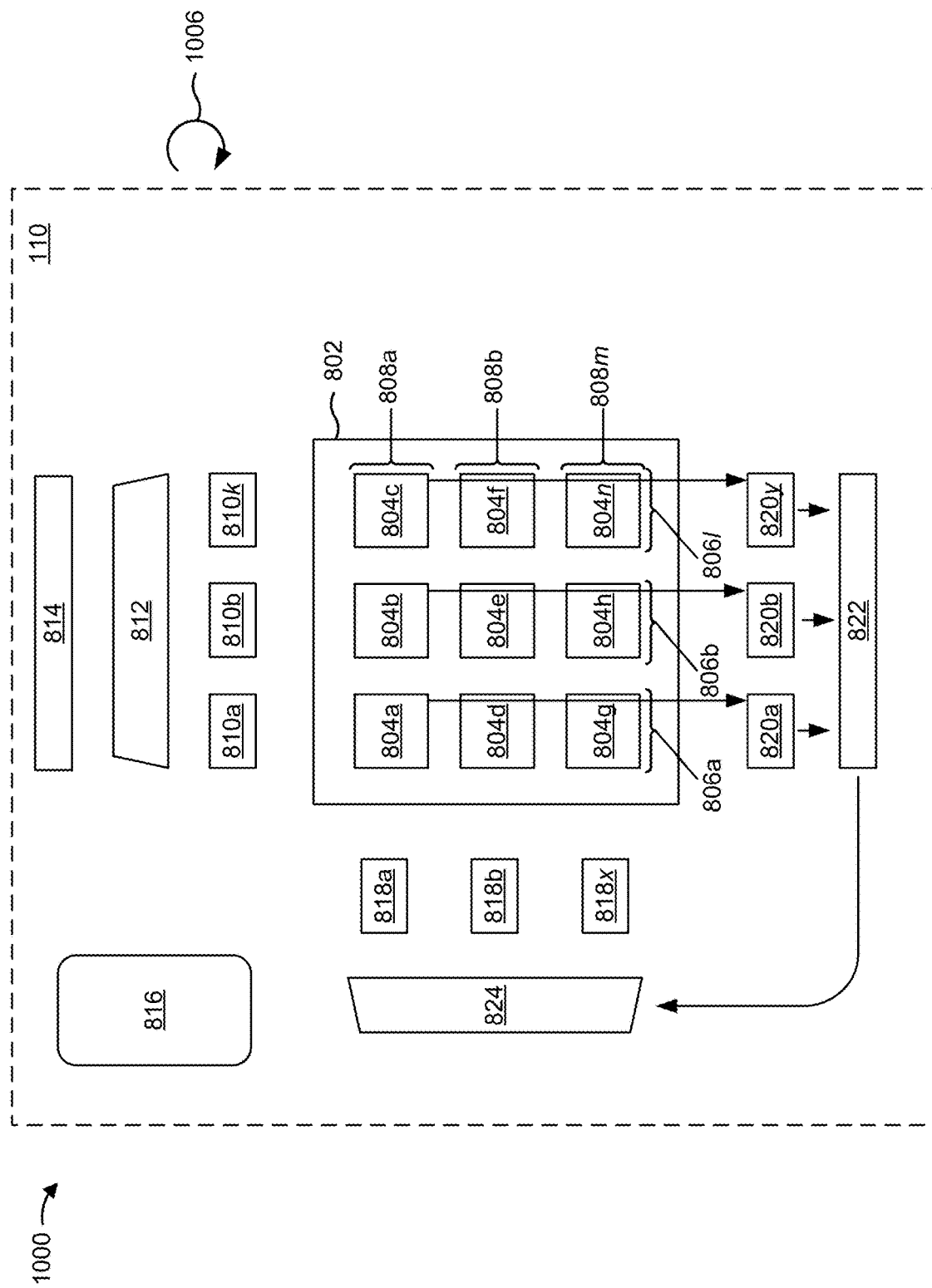

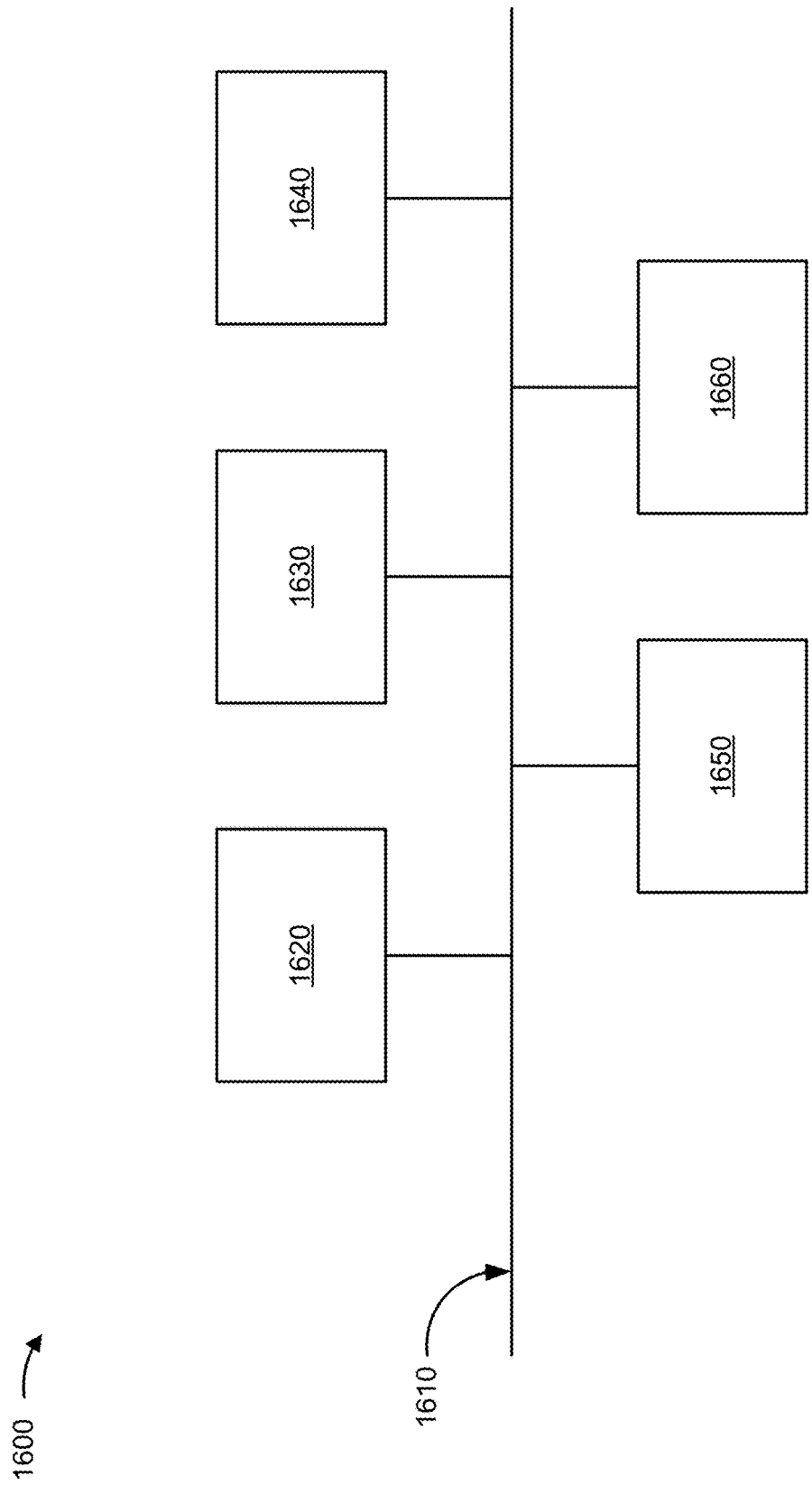

ARTIFICIAL INTELLIGENCE ACCELERATOR DEVICE

BACKGROUND

An artificial intelligence (AI) accelerator device is a class of specialized hardware that may be used to accelerate machine learning workloads, which are typically modeled as a neural network that involves large-scale memory accesses and highly-parallelized computations. An AI accelerator device may be implemented in one or more types of hardware, such as a central processing unit (CPU), a graphics processing unit (GPU), a field programmable gate array (FPGA), and/or an application-specific integrated circuit (ASIC), among other examples.

BRIEF DESCRIPTION OF THE DRAWINGS

Aspects of the present disclosure are best understood from the following detailed description when read with the accompanying figures. It is noted that, in accordance with the standard practice in the industry, various features are not drawn to scale. In fact, the dimensions of the various features may be arbitrarily increased or reduced for clarity of discussion.

FIGS. 10A-10C are diagrams of an example implementation described herein.

FIG. 16 is a diagram of example components of a device described herein.

DETAILED DESCRIPTION

Figure 1:
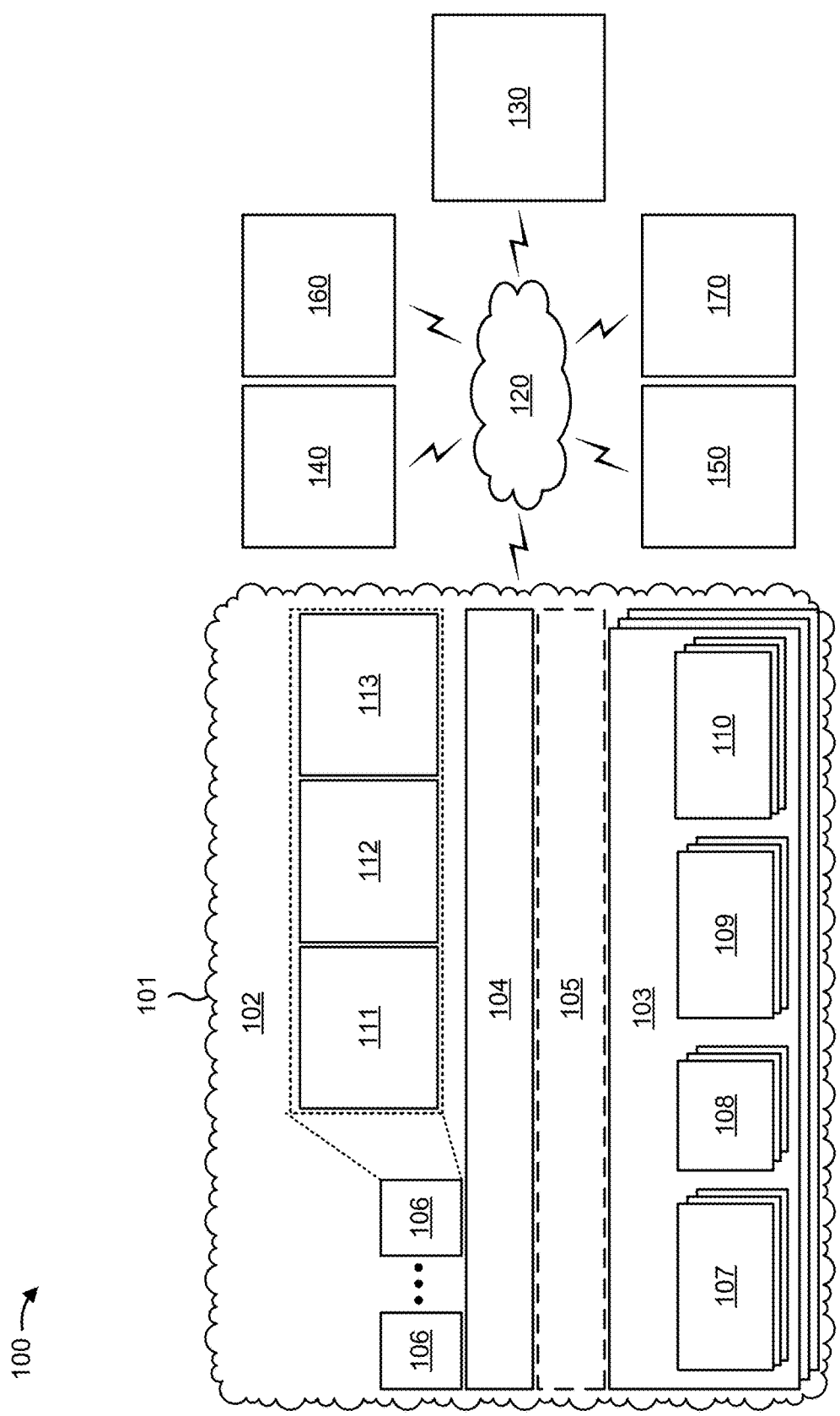
FIG. 1 is a diagram of an example environment in which systems and/or methods described herein may be implemented.

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the various examples. This repetition is for the purpose of simplicity and clarity and does not in itself dictate a relationship between the various embodiments and/or configurations discussed.

An application specific integrated circuit (ASIC)-based AI accelerator device is a type of hardware device that may include a processing element (PE) array that includes a plurality of PEs spatially and/or temporally arranged to perform a particular type of operation, such as a multiply-and-accumulate (MAC) operation in a neural network. A MAC operation is a type of weighted sum operation in which a multiply operation is performed on two or more inputs, and the output from the multiply operation is accumulated with a partial sum in an accumulate operation in order to generate an updated partial sum.

The PE array of an ASIC-based AI accelerator device may be connected with relatively large monolithic on-chip buffers that include memory devices such as static random access memory (SRAM) memory devices. An on-chip buffer may enable data (e.g., weights, activations, partial sums) to be stored locally near the PE array to reduce latency in operation of the ASIC-based AI accelerator device and to reduce the need for frequently accessing slower dynamic random access memory (DRAM) of the ASIC-based AI accelerator device. However, as the size of neural networks implemented by ASIC-based AI accelerator devices increases, so too do the size and complexity of the associated on-chip buffers.

Larger monolithic on-chip buffers may suffer from increased latency and/or greater access energy due to the increased wire routing complexity in the on-chip buffers, which may reduce the operating efficiency and may reduce the performance of an ASIC-based AI accelerator that includes the monolithic on-chip buffers. Moreover, larger and more complex monolithic on-chip buffers may need greater memory bandwidth to transfer data to and from the PE array of an ASIC-based AI accelerator. If the memory bandwidth between the monolithic on-chip buffers and the PE array is limited, the monolithic on-chip buffers may not be capable of transferring a sufficient amount of data to and from the PE array, which may result in underutilization of the PEs in the PE array and reduced performance for the ASIC-based AI accelerator.

Some implementations described herein include an ASIC-based AI accelerator device in which on-chip buffers associated with a PE array are partitioned into a plurality of mini buffers (e.g., mini input buffers, mini weight buffers, and/or mini accumulator buffers). Each mini buffer is associated with a subset of rows and a subset of columns of the PE array. The ASIC-based AI accelerator device may include a distributor circuit to direct data to the appropriate mini buffers of the ASIC-based AI accelerator device. Partitioning the on-chip buffers of the ASIC-based AI accelerator device into the mini buffers described herein may reduce the size of the on-chip buffers of the ASIC-based AI accelerator device. The reduced size of the on-chip buffers may reduce the wire routing complexity of the on-chip buffers, which may reduce latency and reduce access energy for the ASIC-based AI accelerator device. This may increase the operating efficiency and/or may increase the performance of the ASIC-based AI accelerator device. Moreover, connecting the mini buffers of the ASIC-based AI accelerator device to subsets of rows and columns of the PE array of the ASIC-based AI accelerator device may increase the overall bandwidth that is available for the mini buffers to transfer data to and from the PE array, which may increase the utilization of the PEs in the PE array and may increase performance for the ASIC-based AI accelerator device.

In this way, an ASIC-based AI accelerator device may include on-chip buffers associated with a PE array are partitioned into a plurality of mini buffers (e.g., mini input buffers, mini weight buffers, and/or mini accumulator buffers). Each mini buffer is associated with a subset of rows and a subset of columns of the PE array. The ASIC-based AI accelerator device may include a distributor circuit to direct data to the appropriate mini buffers of the ASIC-based AI accelerator device. Partitioning the on-chip buffers of the ASIC-based AI accelerator device into the mini buffers described herein may reduce the size of the on-chip buffers of the ASIC-based AI accelerator device. The reduced size of the on-chip buffers may reduce the wire routing complexity of the on-chip buffers, which may reduce latency and reduce access energy for the ASIC-based AI accelerator device. This may increase the operating efficiency and/or may increase the performance of the ASIC-based AI accelerator device. Moreover, connecting the mini buffers of the ASIC-based AI accelerator device to subsets of rows and columns of the PE array of the ASIC-based AI accelerator device may increase the overall bandwidth that is available for the mini buffers to transfer data to and from the PE array, which may increase the utilization of the PEs in the PE array and may increase performance for the ASIC-based AI accelerator device.

FIG. 1 is a diagram of an example environment 100 in which systems and/or methods described herein may be implemented. As shown in FIG. 1, environment 100 may include an edge computing system 101, which may include one or more elements of and/or may execute within a cloud computing system 102. The cloud computing system 102 may include one or more elements 103-113, as described in more detail below. As further shown in FIG. 1, environment 100 may include a network 120 and one or more client devices 130-170. Devices and/or elements of environment 100 may interconnect via wired connections and/or wireless connections.

The cloud computing system 102 includes computing hardware 103, a resource management component 104, a host operating system (OS) 105, and/or one or more virtual computing systems 106. The resource management component 104 may perform virtualization (e.g., abstraction) of computing hardware 103 to create the one or more virtual computing systems 106. Using virtualization, the resource management component 104 enables a single computing device (e.g., a computer or a server) to operate like multiple computing devices, such as by creating multiple isolated virtual computing systems 106 from computing hardware 103 of the single computing device. In this way, computing hardware 103 can operate more efficiently, with lower power consumption, higher reliability, higher availability, higher utilization, greater flexibility, and lower cost than using separate computing devices.

Computing hardware 103 includes hardware and corresponding resources from one or more computing devices. For example, computing hardware 103 may include hardware from a single computing device (e.g., a single server) or from multiple computing devices (e.g., multiple servers), such as multiple computing devices in one or more data centers. As shown, computing hardware 103 may include one or more processors 107, one or more memories 108, one or more networking components 109, and one or more AI accelerator devices 110. Examples of a processor, a memory, and a networking component (e.g., a communication component) are described in connection with FIG. 16.

An AI accelerator device 110 may include a hardware device that includes application-specific circuitry configured to perform operations associated with a neural network (e.g., an artificial neural network or a deep neural network). The AI accelerator device 110 may include an ASIC device in which hardware (e.g., drivers, transistors, repeaters, complementary metal oxide semiconductor (CMOS) logic) is specifically configured to implement nodes (or artificial neurons) of a neural network to perform AI operations, and therefore is referred to as a hardware accelerator.

The edge computing system 101 may perform one or more operations and/or processes associated with AI and/or neural network processing. In particular, the edge computing system 101 may use the AI accelerator device(s) 110 to perform AI-specific computing tasks and workloads. An example AI-specific computing task may include receiving an input (e.g., an image) from a client device of the client devices 130-170 through the network 120 and generating, using the AI accelerator device(s) 110, an output (e.g., an inference or a classification) based on the input. Here, the AI-specific computing task may involve identifying objects in the image, tagging the image with one or more tags, classifying the content of the image, and/or performing an image search based on the image, among other examples.

The generation of the output may involve the use of a multiply-and-accumulate (MAC) operation, in which inputs are multiplied with weights and accumulated with a partial sum to generate an updated partial sum. In some implementations, a node of an AI accelerator device 110 may have a threshold such that the updated partial sum is provided only if the updated partial sum satisfies a threshold. This is referred to as "firing" of the node.

The weights applied by the nodes of an AI accelerator device 110 may be adjusted or "trained" using machine learning. This involves supervised and/or unsupervised training, in which large data sets are provided to the nodes of an AI accelerator device 110 to "learn" or form connections between inputs and outputs of the large data sets.

The resource management component 104 includes a virtualization application (e.g., executing on hardware, such as computing hardware 103) capable of virtualizing computing hardware 103 to start, stop, and/or manage one or more virtual computing systems 106. For example, the resource management component 104 may include a hypervisor (e.g., a bare-metal or Type 1 hypervisor, a hosted or Type 2 hypervisor, or another type of hypervisor) or a virtual machine monitor, such as when the virtual computing systems 106 are virtual machines. Additionally, or alternatively, the resource management component 104 may include a container manager, such as when the virtual computing systems 106 are containers 112. In some implementations, the resource management component 104 executes within and/or in coordination with a host operating system 105.

A virtual computing system 106 includes a virtual environment that enables cloud-based execution of operations and/or processes described herein using computing hardware 103. As shown, a virtual computing system 106 may include a virtual machine 111, a container 112, or a hybrid environment 113 that includes a virtual machine and a container, among other examples. A virtual computing system 106 may execute one or more applications using a file system that includes binary files, software libraries, and/or other resources required to execute applications on a guest operating system (e.g., within the virtual computing system 106) or the host operating system 105.

Although the edge computing system 101 may include one or more elements 103-113 of the cloud computing system 102, may execute within the cloud computing system 102, and/or may be hosted within the cloud computing system 102, in some implementations, the edge computing system 101 may not be cloud-based (e.g., may be implemented outside of a cloud computing system) or may be partially cloud-based. For example, the edge computing system 101 may include one or more devices that are not part of the cloud computing system 102, such as device 1600 of FIG. 16, which may include a standalone server or another type of computing device.

Network 120 includes one or more wired and/or wireless networks. For example, network 120 may include a cellular network, a public land mobile network (PLMN), a local area network (LAN), a wide area network (WAN), a private network, the Internet, and/or a combination of these or other types of networks. The network 120 enables communication among the devices of environment 100.

The client devices 130-170 may include one or more devices capable of receiving, generating, storing, processing, and/or providing information. The client device 130-170 may include a communication device and/or a computing device. For example, the client device 130-170 may include a wireless communication device, a mobile phone, a user equipment, a laptop computer, a tablet computer, a desktop computer, a wearable communication device (e.g., a smart wristwatch, a pair of smart eyeglasses, a head mounted display, or a virtual reality headset), or a similar type of device.

The number and arrangement of devices and networks shown in FIG. 1 are provided as an example. In practice, there may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally, or alternatively, a set of devices (e.g., one or more devices) of environment 100 may perform one or more functions described as being performed by another set of devices of environment 100.

Figure 2:
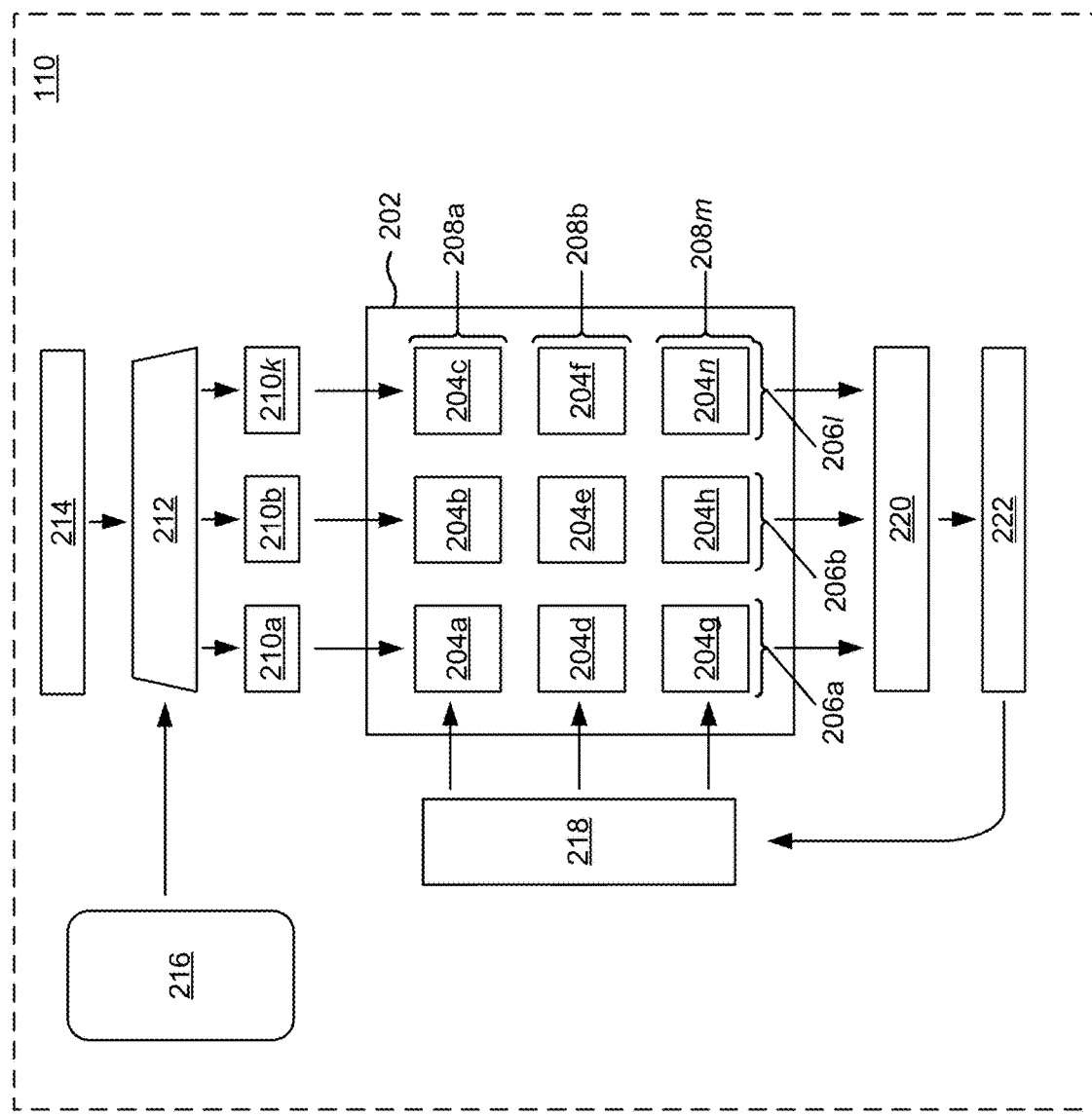
FIGS. 2-9 are diagrams of example implementations of an artificial intelligence (AI) accelerator device described herein.

FIG. 2 is a diagram of an example implementation 200 of an AI accelerator device 110 described herein. The AI accelerator device 110 may include an ASIC-based AI accelerator device (e.g., an AI accelerator implemented in an application specific integrated circuit) or another type of AI hardware accelerator. The AI accelerator device 110 may be configured to perform artificial neural network and/or deep neural network operations, machine learning operations (e.g., training on large data sets to adjust the weights of the artificial neural network and/or deep neural network), and/or to perform other AI operations. The AI accelerator device 110 may include components 202-222, which may be included on a same semiconductor die or on a same packaged semiconductor device.

As shown in FIG. 2, in the example implementation 200, the AI accelerator device 110 may include a processing element array 202 that includes a plurality of processing element circuits 204a-204n arranged in a grid or in a matrix (e.g., a systolic array, a vector engine arrangement). In particular, the processing element circuits 204a-204n are arranged into a plurality of columns 206a-206l and a plurality of rows 208a-208m. For example, processing element circuits 204a, 204d, and 204g may be included in column 206a, processing element circuits 204b, 204e, and 204h may be included in column 206b, processing element circuits 204c, 204f, and 204n may be included in column 206l, and so on. As another example, processing element circuits 204a-204c may be included in row 208a, processing element circuits 204d-204f may be included in row 208b, processing element circuits 204g-204n may be included in row 208m, and so on.

In some implementations, the processing element array 202 includes a systolic array, in which computation is fully pipelined, and data is provided to the edges of the processing element array 202 and permitted to propagate through the processing element array 202 in a wave-like fashion through processing element interconnect. This type of processing element array configuration may increase and/or maximize data reuse within the processing element array 202. In some implementations, the processing element array 202 includes a vector engine, in which one operand (e.g., a multiplication operand, an accumulation operand) is stationary in the processing element circuits 204a-204n, and the other operand is multicasted to the same rows and/or columns. The partial sums are collected in a combinational manner through an adder tree.

A processing element circuit may include circuitry that is configured to perform a neural network operation. For example, each of the processing element circuits 204a-204n may be configured to perform a multiply-and-accumulate (MAC) operation. Accordingly, each of the processing element circuits 204a-204n may include multiplication circuitry, accumulator circuitry, input circuitry, output circuitry, and routing between circuit components (e.g., metallization lines), among other examples. In some implementations, the processing element circuits 204a-204n are connected such that the output of one processing element is provided as input to one or more other processing element circuits in the processing element array 202. The processing element circuits 204a-204n are arranged in a grid or in a matrix to enable the processing element array 202 to process highly parallelized computational tasks in an efficient manner.

As further shown in FIG. 2, in the example implementation 200, the AI accelerator device 110 may include a plurality of weight buffers (e.g., a plurality of mini weight buffers) 210a-210k. The weight buffers 210a-210k may be coupled with a weight buffer multiplexer circuit 212 and may be configured to buffer weight data (e.g., weights for the processing element circuits 204a-204n) that is to be provided from a memory device 214 (e.g., a DRAM memory device or another type of memory device) to the processing element circuits 204a-204n of the processing element array 202.

Each of the weight buffers 210a-210k may include one or more SRAM devices (or another type of memory devices having faster access times relative to the memory device 214, which may be a magnetic random access memory (MRAM), resistive random access memory (RRAM), phase change material random access memory (PCM-RAM), and/or ferroelectric random access memory (FeRAM)), drivers, inverters, repeaters, and associated routing (e.g., metallization lines) that connects the weight buffers 210a-210k to the processing element array 202. The use of the weight buffers 210a-210k, as opposed to direct memory access to the memory device 214, reduces access times and latency for providing weights to the processing element circuits 204a-204n. The weight buffer multiplexer (MUX) circuit 212 may include logic circuitry (e.g., AND gates, OR gates, drivers, inverters, repeaters) that is configured to enable selection of specific ones of the weight buffers 210a-210k and to enable weights to provide increased flexibility in writing data to different weight buffers 210a-210k.

Each of the weight buffers 210a-210k may be associated with, and may provide weights to, a subset of the columns 206a-206l of processing element circuits 204a-204n included in the processing element array 202. In some implementations, each of the weight buffers 210a-210k may be associated with, and may provide weights to, a single respective column of the columns 206a-206l. For example, the weight buffer 210a may be associated with, and may provide weights to, the column 206a; the weight buffer 210b may be associated with, and may receive provide weights to, the column 206b; and so on. In some implementations, each of the weight buffers 210a-210k may be associated with, and may provide weights to, a plurality of columns of the columns 206a-206l.

Including a plurality of weight buffers (e.g., a plurality of mini weight buffers) in the AI accelerator device 110 may reduce the latency and energy consumption of the weight buffers of the AI accelerator device 110 relative to the use of a single monolithic weight buffer. The reduced latency and energy consumption is achieved through the reduced complexity of each of the weight buffers 210a-210k. In particular, including plurality of weight buffers (e.g., a plurality of mini weight buffers) reduces the size and complexity of routing between SRAM devices of the weight buffers 210a-210k and reduces the size and complexity of routing between the SRAM devices and the processing element array 202. The reduced size and complexity of routing in the weight buffers 210a-210k and between the weight buffers 210a-210k and the processing element array 202 reduces the propagation distance of weight data in the weight buffers 210a-210k and between the weight buffers 210a-210k and the processing element array 202. The reduced propagation distance results in faster propagation times (thus, lower latency), increased available bandwidth, and/or reduced access energy.

The quantity of weight buffers 210a-210k included in the AI accelerator device 110, and the quantity of the columns 206a-206l associated with each of the weight buffers 210a-210k, may be selected to satisfy one or more parameters, such as energy consumption of the weight buffers 210a-210k, latency of the weight buffers 210a-210k, and/or the physical footprint of the weight buffers 210a-210k. For example, increasing the quantity of weight buffers 210a-210k included in the AI accelerator device 110 (which decreases the quantity of the columns 206a-206l associated with each of the weight buffers 210a-210k) may decrease latency and energy consumption in the AI accelerator device 110 at the expense of increased size of the AI accelerator device 110 (e.g., because of the additional isolation needed between adjacent mini weight buffers).

As another example, decreasing the quantity of weight buffers 210a-210k included in the AI accelerator device 110 (which increases the quantity of the columns 206a-206l associated with each of the weight buffers 210a-210k) may decrease the size of the AI accelerator device 110 at the expense of increased latency and energy consumption in the AI accelerator device 110.

In some cases, a design constraint may be used to determine the quantity of the columns 206a-206l that is to be associated with each of the weight buffers 210a-210k. For example, if the quantity of weight buffers 210a-210k is constrained to N, the quantity of the columns 206a-206l that is to be associated with each of the weight buffers 210a-210k may be determined as:

$$S = \frac{L}{N}$$

where S corresponds to the quantity of columns 206a-206l per weight buffer, and L corresponds to the quantity of columns 206a-206l in the processing element array 202.

As further shown in FIG. 2, in the example implementation 200, the AI accelerator device 110 may include a distributor circuit 216 that is coupled with the weight buffer multiplexer circuit 212. The distributor circuit 216 may include circuitry (e.g., state-machine based controller circuitry) that is configured to provide one or more select signals (e.g., weight select signals) to the weight buffer multiplexer circuit 212. The distributor circuit 216 may provide select signal(s) to the weight buffer multiplexer circuit 212 to select specific ones of the weight buffers 210a-210k. In this way, the weight buffer multiplexer circuit 212 enables the distributor circuit 216 to independently control the weight buffers 210a-210k to provide weights to specific columns of the processing element array 202.

A single monolithic activation buffer 218 is included and is associated with the rows 208a-208m of the processing element array 202. The single monolithic activation buffer 218 is configured to provide input data to processing element circuits 204a-204n in the rows 208a-208m. The input data may include partial sums, values that are to be multiplied, and/or other input data. The single monolithic activation buffer 218 may include one or more SRAM devices, drivers, inverters, repeaters, and associated routing (e.g., metallization lines) that connects the single monolithic activation buffer 218 to the processing element array 202.

A single monolithic accumulator buffer 220 is included and is associated with the columns 206a-206l of the processing element array 202. The single monolithic accumulator buffer 220 is configured to receive output data (e.g., updated partial sums) from the processing element circuits 204a-204n in the columns 206a-206l. The single monolithic accumulator buffer 220 may include one or more SRAM devices, drivers, inverters, repeaters, and associated routing (e.g., metallization lines) that connects the single monolithic accumulator buffer 220 to the processing element array 202.

The single monolithic accumulator buffer 220 may be further configured to provide the updated partial sums to peripheral circuitry 222, which may include circuitry (e.g., DRAM, logic circuitry, routing) that is configured to store and/or provide the updated partial sums to the single monolithic activation buffer 218 for use in subsequent neural network operations.

As indicated above, FIG. 2 is provided as an example. Other examples may differ from what is described with regard to FIG. 2.

Figure 3:
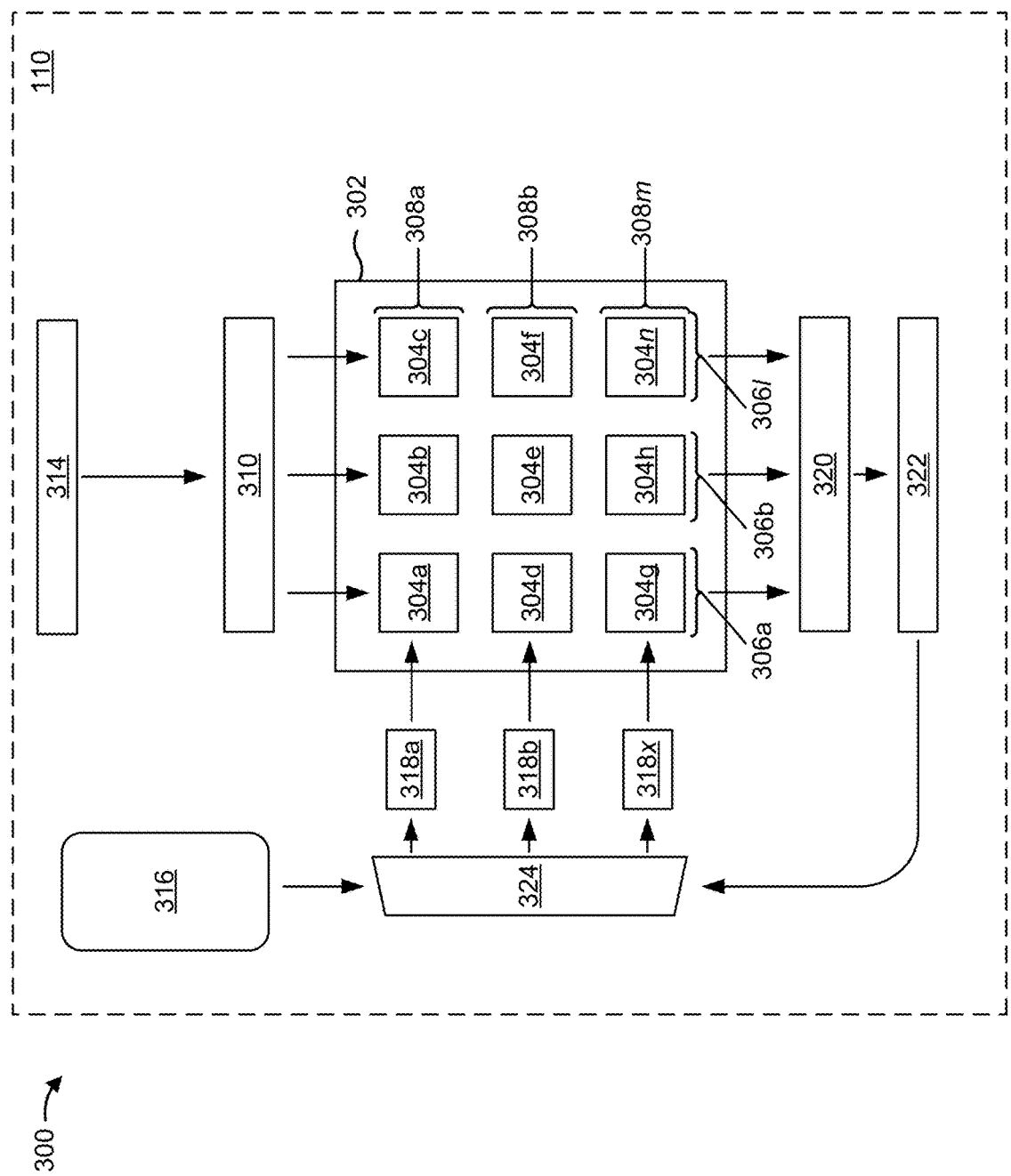

FIG. 3 is a diagram of an example implementation 300 of an AI accelerator device 110 described herein. The example implementation 300 of the AI accelerator device 110 is similar to the example implementation 200 of the AI accelerator device 110, and includes components that are similar to the components of the example implementation 200 of the AI accelerator device 110. However, in the example implementation 300 of the AI accelerator device 110, a single monolithic weight buffer is included as opposed to a plurality of weight buffers (e.g., a plurality of mini weight buffers), and therefore a weight multiplexer circuit may be omitted from the AI accelerator device 110 in the example implementation 300. Moreover, a plurality of activation buffers (e.g., a plurality of mini activation buffers) are included as opposed to a single monolithic activation buffer. The plurality of activation buffers (e.g., a plurality of mini activation buffers) may be included to reduce the latency and energy consumption of the activation buffer of the AI accelerator device 110 relative to the latency and energy consumption of a single monolithic activation buffer.

As shown in FIG. 3, in the example implementation 300, the AI accelerator device 110 may include a processing element array 302 that includes a plurality of processing element circuits 304a-304n arranged in a grid or in a matrix. In particular, the processing element circuits 304a-304n are arranged into a plurality of columns 306a-306l and a plurality of rows 308a-308m. The single monolithic weight buffer 310 is associated with the plurality of columns 306a-306l, and is associated with a memory device 314 that is configured to store the weights for the processing element circuits 304a-304n.

As shown in FIG. 3, in the example implementation 300, the AI accelerator device 110 may include a distributor circuit 316, a plurality of activation buffers 318a-318x, a single monolithic accumulator circuit 320, and peripheral circuitry 322. Each activation buffer 318a-318x may include an independent circuit (e.g., independent from the other activation buffer 318a-318x), which my reduce the complexity of the metallization routing and layout for the activation buffers 318a-318x. Each of the activation buffers 318a-318x may be associated with, and may provide input data to, a subset of the rows 308a-308m of processing element circuits 304a-304n included in the processing element array 302. In some implementations, each of the activation buffers 318a-318x may be associated with, and may provide input data to, a single respective row of the rows 308a-308m. For example, the activation buffer 318a may be associated with, and may provide input data to, the row 308a; the activation buffer 318b may be associated with, and may provide input data to, the row 308b; and so on. In some implementations, each of the activation buffers 318a-318x may be associated with, and may provide input data to, a plurality of rows of the rows 308a-308m.

Including a plurality of activation buffers (e.g., a plurality of mini activation buffers) in the AI accelerator device 110 may reduce the latency and energy consumption of the activation buffer of the AI accelerator device 110 relative to the use of a single monolithic activation buffer. The reduced latency and energy consumption is achieved through the reduced complexity of each of the activation buffers 318a-318x. In particular, including a plurality of activation buffers (e.g., a plurality of mini activation buffers) reduces the size and complexity of routing between SRAM devices of the activation buffers 318a-318x and reduces the size and complexity of routing between the SRAM devices and the processing element array 302. The reduced size and complexity of routing in the activation buffers 318a-318x and between the activation buffers 318a-318x and the processing element array 302 reduces the propagation distance of input data in the activation buffers 318a-318x and between the activation buffers 318a-318x and the processing element array 302. The reduced propagation distance results in faster propagation times (thus, lower latency), increased available bandwidth, and/or reduced access energy.

The quantity of activation buffers 318a-318x included in the AI accelerator device 110, and the quantity of the rows 308a-308m associated with each activation buffer, may be selected to satisfy one or more parameters, such as energy consumption of the activation buffers 318a-316x, latency of the activation buffers 318a-318x, and/or the physical footprint of the activation buffers 318a-318x. For example, increasing the quantity of activation buffers 318a-318x included in the AI accelerator device 110 (which decreases the quantity of the rows 308a-308m associated with each of the activation buffers 318a-318x) may decrease latency and energy consumption in the AI accelerator device 110 at the expense of increased size of the AI accelerator device 110.

As another example, decreasing the quantity of activation buffers 318a-318x included in the AI accelerator device 110 (which increases the quantity of the rows 308a-308m associated with each of the activation buffers 318a-318x) may decrease the size of the AI accelerator device 110 at the expense of increased latency and energy consumption in the AI accelerator device 110.

In some cases, a design constraint may be used to determine the quantity of the rows 308a-308m that is to be associated with each of the activation buffers 318a-318x. For example, if the quantity of activation buffers 318a-318x is constrained to N, the quantity of the rows 308a-308m that is to be associated with each of the activation buffers 318a-318x may be determined as:

$$S = \frac{L}{N}$$

where S corresponds to the quantity of rows 308a-308m per activation buffer, and L corresponds to the quantity of rows 308a-308m in the processing element array 302.

As shown in FIG. 3, in the example implementation 300, the AI accelerator device 110 may include an activation buffer multiplexer circuit 324 coupled with the distributor circuit 316 and the activation buffers 318a-318x. The distributor circuit 316 may be configured to provide one or more select signals (e.g., activation select signals) to the activation buffer multiplexer circuit 324. The distributor circuit 316 may provide select signal(s) to the activation buffer multiplexer circuit 324 to select specific ones of the activation buffers 318a-318x. In this way, the activation buffer multiplexer circuit 324 enables distributor circuit 316 to independently control the activation buffers 318a-318x to provide input data to specific rows of the processing element array 302.

The single monolithic accumulator circuit 320 may be further configured to provide the updated partial sums to the peripheral circuitry 322, which may include circuitry (e.g., DRAM, logic circuitry, routing) that is configured to store and/or provide the updated partial sums to the activation buffer multiplexer circuit 324 for use in subsequent neural network operations.

As indicated above, FIG. 3 is provided as an example. Other examples may differ from what is described with regard to FIG. 3.

Figure 4:
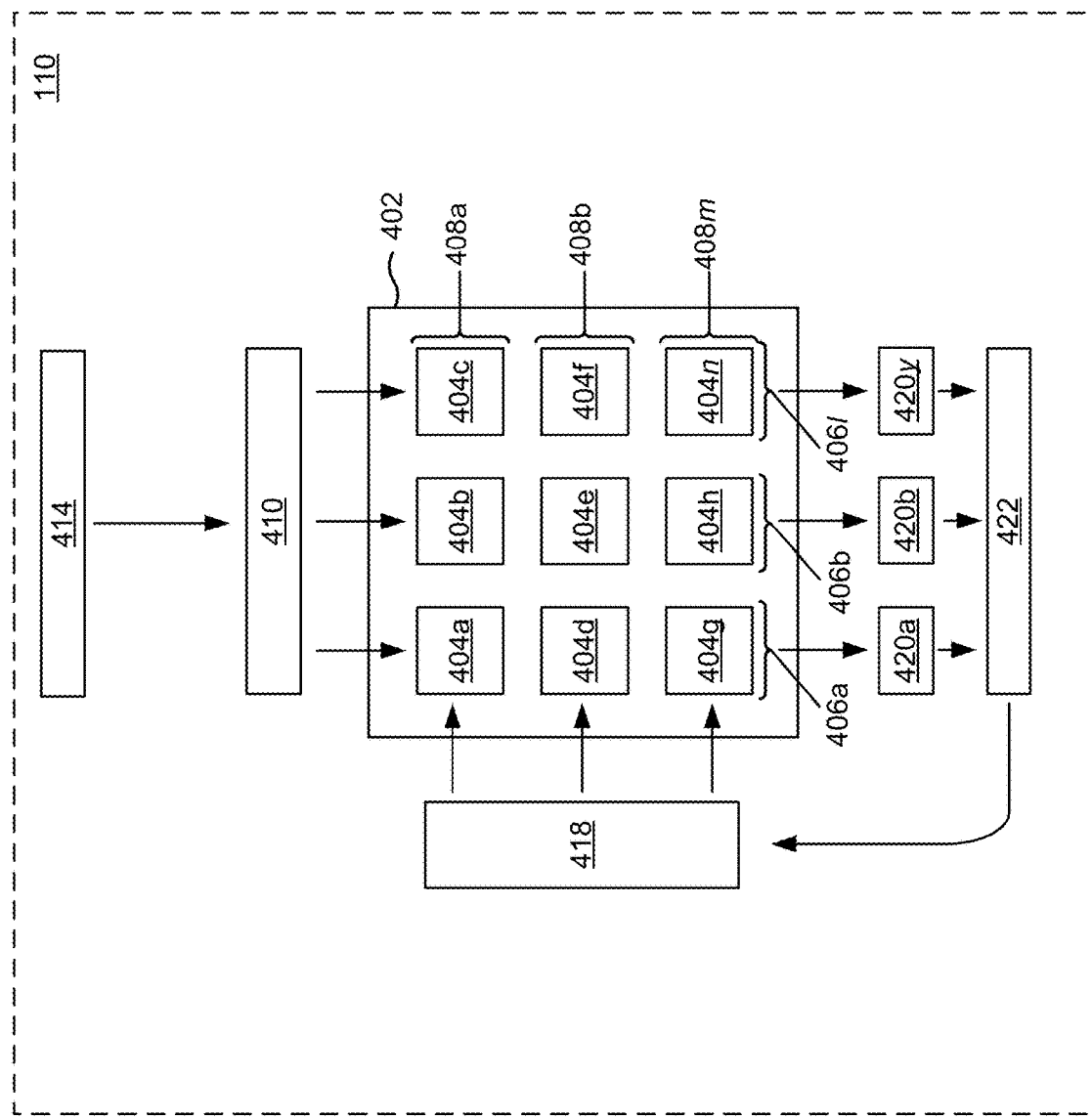

FIG. 4 is a diagram of an example implementation 400 of an AI accelerator device 110 described herein. The example implementation 400 of the AI accelerator device 110 is similar to the example implementation 200 of the AI accelerator device 110, and includes components that are similar to the components of the example implementation 200 of the AI accelerator device 110. However, in the example implementation 400 of the AI accelerator device 110, a single monolithic weight buffer is included as opposed to a plurality of weight buffers 210a-210k (e.g., a plurality of mini weight buffers). Accordingly, a weight buffer multiplexer circuit and a distributor circuit may be omitted from the AI accelerator device 110 in the example implementation 400. Moreover, a plurality of accumulator buffers (e.g., a plurality of mini accumulator buffers) are included as opposed to a single monolithic accumulator buffer. The plurality of accumulator buffers (e.g., a plurality of mini accumulator buffers) may be included to reduce the latency and energy consumption of the accumulator buffer of the AI accelerator device 110 relative to the latency and energy consumption of a single monolithic accumulator buffer.

As shown in FIG. 4, in the example implementation 400, the AI accelerator device 110 may include a processing element array 402 that includes a plurality of processing element circuits 404a-404n arranged in a grid or in a matrix. In particular, the processing element circuits 404a-404n are arranged into a plurality of columns 406a-406l and a plurality of rows 408a-408m. A single monolithic weight buffer 410 is associated with the plurality of columns 406a-406l, and is associated with a memory device 414 that is configured to store the weights for the processing element circuits 404a-404n. A single monolithic activation buffer 418 is included and is associated with the rows 408a-408m of the processing element array 402. The single monolithic activation buffer 418 is configured to provide input data to processing element circuits 404a-404n in the rows 408a-408m.

As shown in FIG. 4, in the example implementation 400, the AI accelerator device 110 may include a plurality of accumulator buffers 420a-420y (e.g., a plurality of mini accumulator buffers) coupled with the processing element array 402 and peripheral circuitry 422. Each of the accumulator buffers 420a-420y may be associated with, and may receive output data (e.g., a partial sum) from, a subset of the columns 406a-406l of processing element circuits 404a-404n included in the processing element array 402. In some implementations, each of the accumulator buffers 420a-420y may be associated with, and may receive an output from, a single respective column of the columns 406a-406l. For example, the accumulator buffer 420a may be associated with, and may receive an output from, the column 406a; the accumulator buffer 420b may be associated with, and may receive an output from, the column 406b; and so on. In some implementations, each of the accumulator buffers 420a-420y may be associated with, and may receive an output from, a plurality of columns of the columns 406a-406l. The accumulator buffers 420a-420y may be configured to provide outputs to the peripheral circuitry 422, which provides the outputs to the single monolithic activation buffer 418.

Including a plurality of accumulator buffers (e.g., a plurality of mini accumulator buffers) in the AI accelerator device 110 may reduce the latency and energy consumption of the accumulator buffer of the AI accelerator device 110 relative to the use of a single monolithic accumulator buffer. The reduced latency and energy consumption is achieved through the reduced complexity of each of the accumulator buffers 420a-420y. In particular, including plurality of accumulator buffers (e.g., a plurality of mini accumulator buffers) reduces the size and complexity of routing between SRAM devices of the accumulator buffers 420a-420y and reduces the size and complexity of routing between the SRAM devices and the processing element array 402. The reduced size and complexity of routing in the accumulator buffers 420a-420y and between the accumulator buffers 420a-420y and the processing element array 402 reduces the propagation distance of output data in the accumulator buffers 420a-420y and between the accumulator buffers 420a-420y and the processing element array 402. The reduced propagation distance results in faster propagation times (thus, lower latency), increased available bandwidth, and/or reduced access energy.

The quantity of accumulator buffers 420a-420y included in the AI accelerator device 110, and the quantity of the columns 406a-406l associated with each activation buffer, may be selected to satisfy one or more parameters, such as energy consumption of the accumulator buffers 420a-420y, latency of the accumulator buffers 420a-420y, and/or the physical footprint of the accumulator buffers 420a-420y. For example, increasing the quantity of accumulator buffers 420a-420y included in the AI accelerator device 110 (which decreases the quantity of the columns 406a-406l associated with each of the accumulator buffers 420a-420y) may decrease latency and energy consumption in the AI accelerator device 110 at the expense of increased size of the AI accelerator device 110.

As another example, decreasing the quantity of accumulator buffers 420a-420y included in the AI accelerator device 110 (which increases the quantity of the columns 406a-406l associated with each of the accumulator buffers 420a-420y) may decrease the size of the AI accelerator device 110 at the expense of increased latency and energy consumption in the AI accelerator device 110.

In some cases, a design constraint may be used to determine the quantity of the columns 406a-406l that is to be associated with each of the accumulator buffers 420a-420y. For example, if the quantity of accumulator buffers 420a-420y is constrained to N, the quantity of the columns 406a-406l that is to be associated with each of the accumulator buffers 420a-420y may be determined as:

$$S = \frac{L}{N}$$

where S corresponds to the quantity of columns 406a-406l per accumulator buffer, and L corresponds to the quantity of columns 406a-406l in the processing element array 402.

As indicated above, FIG. 4 is provided as an example. Other examples may differ from what is described with regard to FIG. 4.

Figure 5:
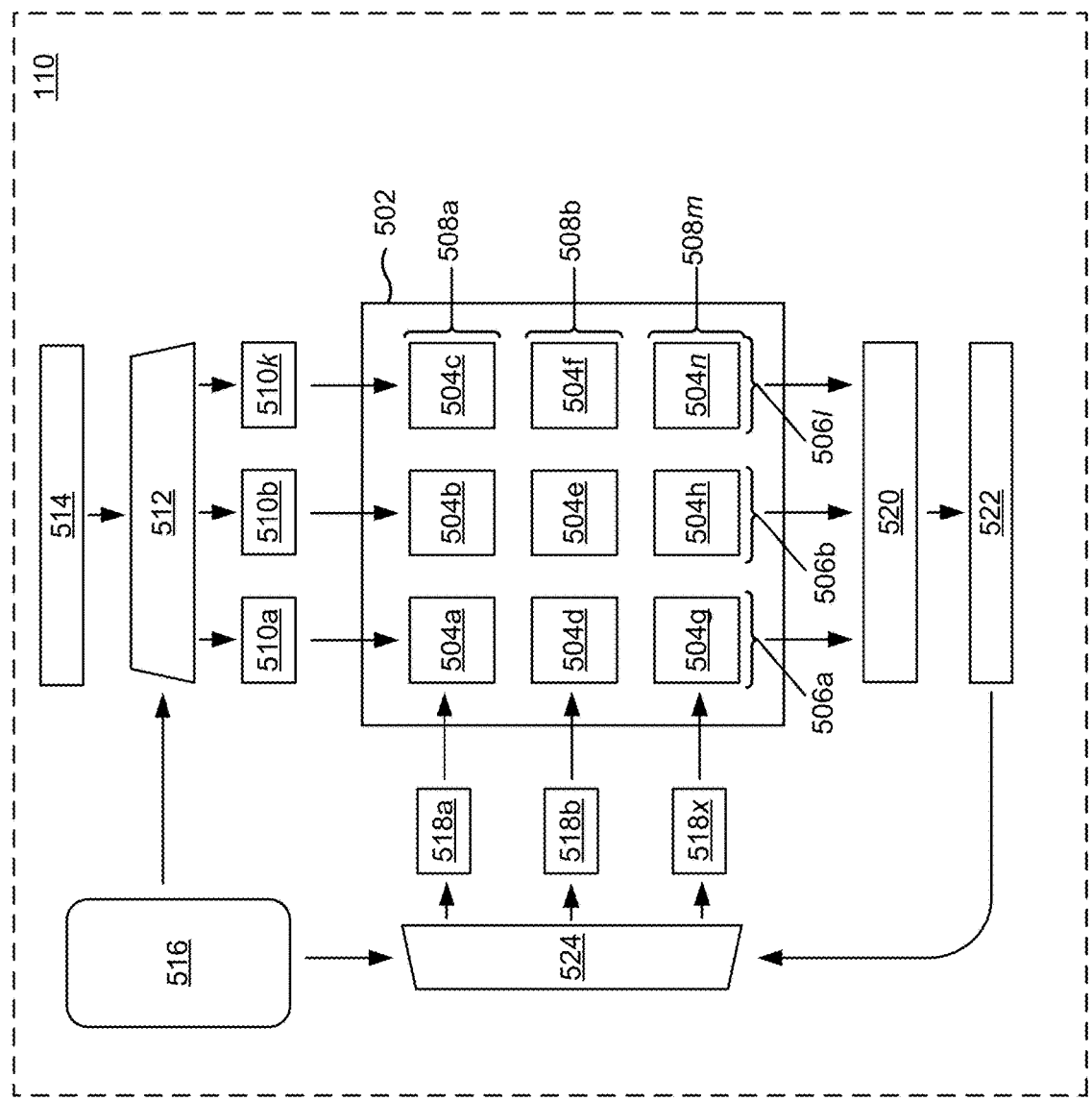

FIG. 5 is a diagram of an example implementation 500 of an AI accelerator device 110 described herein. The example implementation 500 of the AI accelerator device 110 is similar to the example implementation 200 of the AI accelerator device 110, and includes components 502-522 that are similar to the components 202-222 of the example implementation 200 of the AI accelerator device 110. However, in the example implementation 500 of the AI accelerator device 110, a plurality of weight buffers 510a-510k (e.g., a plurality of mini weight buffers) and a plurality of activation buffers 518a-518x (e.g., a plurality of mini activation buffers) are both included. Accordingly, the AI accelerator device 110 in the example implementation 500 may further include an activation buffer multiplexer circuit 524 coupled with the distributor circuit 516 and the activation buffers 518a-518x. The plurality of weight buffers 510a-510k (e.g., a plurality of mini weight buffers) and the plurality of activation buffers 518a-518x (e.g., a plurality of mini activation buffers) may be included to reduce the latency and energy consumption of both the weight buffer and the activation buffer of the AI accelerator device 110 relative to the latency and energy consumption of a single monolithic weight buffer and a single monolithic activation buffer.

Each of the weight buffers 510a-510k may be associated with, and may provide weights to, a subset of the columns 506a-506l of processing element circuits 504a-504n included in the processing element array 502. In some implementations, each of the weight buffers 510a-510k may be associated with, and may provide weights to, a single respective column of the columns 506a-506l. For example, the weight buffer 510a may be associated with, and may provide weights to, the column 506a; the weight buffer 510b may be associated with, and may receive provide weights to, the column 506b; and so on. In some implementations, each of the weight buffers 510a-510k may be associated with, and may provide weights to, a plurality of columns of the columns 506a-506l.

The quantity of weight buffers 510a-510k included in the AI accelerator device 110, and the quantity of the columns 506a-506l associated with each weight buffer, may be selected to satisfy one or more parameters, such as energy consumption of the weight buffers 510a-510k, latency of the weight buffers 510a-510k, and/or the physical footprint of the weight buffers 510a-510k. For example, increasing the quantity of weight buffers 510a-510k included in the AI accelerator device 110 (which decreases the quantity of the columns 506a-506l associated with each of the weight buffers 510a-510k) may decrease latency and energy consumption in the AI accelerator device 110 at the expense of increased size of the AI accelerator device 110. As another example, decreasing the quantity of weight buffers 510a-510k included in the AI accelerator device 110 (which increases the quantity of the columns 506a-506l associated with each of the weight buffers 510a-510k) may decrease the size of the AI accelerator device 110 at the expense of increased latency and energy consumption in the AI accelerator device 110.

Each of the activation buffers 518a-518x may be associated with, and may provide input data to, a subset of the rows 508a-508m of processing element circuits 504a-504n included in the processing element array 502. In some implementations, each of the activation buffers 518a-518x may be associated with, and may provide input data to, a single respective row of the rows 508a-508m. For example, the activation buffer 518a may be associated with, and may provide input data to, the row 508a; the activation buffer 518b may be associated with, and may provide input data to, the row 508b; and so on. In some implementations, each of the activation buffers 518a-518x may be associated with, and may provide input data to, a plurality of rows of the rows 508a-508m.

The quantity of activation buffers 518a-518x included in the AI accelerator device 110, and the quantity of the rows 508a-508m associated with each activation buffer, may be selected to satisfy one or more parameters, such as energy consumption of the activation buffers 518a-518x, latency of the activation buffers 518a-518x, and/or the physical footprint of the activation buffers 518a-518x. For example, increasing the quantity of activation buffers 518a-518x included in the AI accelerator device 110 (which decreases the quantity of the rows 508a-508m associated with each of the activation buffers 518a-518x) may decrease latency and energy consumption in the AI accelerator device 110 at the expense of increased size of the AI accelerator device 110. As another example, decreasing the quantity of activation buffers 518a-518x included in the AI accelerator device 110 (which increases the quantity of the rows 508a-508m associated with each of the activation buffers 518a-518x) may decrease the size of the AI accelerator device 110 at the expense of increased latency and energy consumption in the AI accelerator device 110.

As indicated above, FIG. 5 is provided as an example. Other examples may differ from what is described with regard to FIG. 5.

Figure 6:
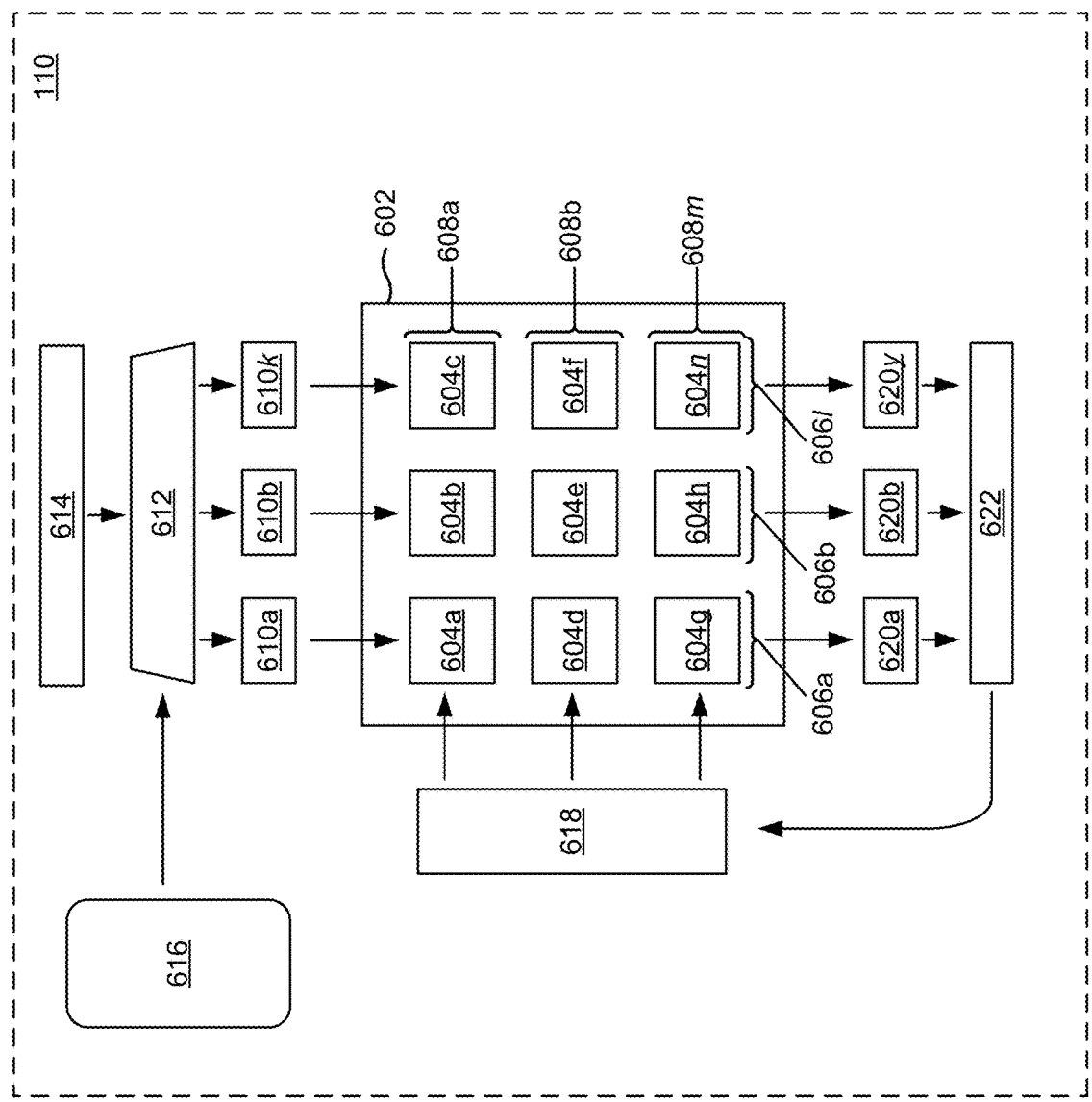

FIG. 6 is a diagram of an example implementation 600 of an AI accelerator device 110 described herein. The example implementation 600 of the AI accelerator device 110 is similar to the example implementation 200 of the AI accelerator device 110, and includes components 602-622 that are similar to the components 202-222 of the example implementation 200 of the AI accelerator device 110. However, in the example implementation 600 of the AI accelerator device 110, a plurality of weight buffers 610a-610k (e.g., a plurality of mini weight buffers) and a plurality of accumulator buffers 620a-620y (e.g., a plurality of mini accumulator buffers) are both included. The plurality of weight buffers 610a-610k (e.g., a plurality of mini weight buffers) and the plurality of accumulator buffers 620a-620y (e.g., a plurality of mini accumulator buffers) may be included to reduce the latency and energy consumption of both the weight buffer and the accumulator buffer of the AI accelerator device 110 relative to the latency and energy consumption of a single monolithic weight buffer and a single monolithic accumulator buffer.

Each of the weight buffers 610a-610k may be associated with, and may receive an output (e.g., a partial sum) from, a subset of the columns 606a-606l of processing element circuits 604a-604n included in the processing element array 602. In some implementations, each of the weight buffers 610a-610k may be associated with, and may provide weights to, a single respective column of the columns 606a-606l. For example, the weight buffer 610a may be associated with, and may provide weights to, the column 606a; the weight buffer 610b may be associated with, and may receive provide weights to, the column 606b; and so on. In some implementations, each of the weight buffers 610a-610k may be associated with, and may provide weights to, a plurality of columns of the columns 606a-606l.

The quantity of weight buffers 610a-610k included in the AI accelerator device 110, and the quantity of the columns 606a-606l associated with each weight buffer, may be selected to satisfy one or more parameters, such as energy consumption of the weight buffers 610a-610k, latency of the weight buffers 610a-610k, and/or the physical footprint of the weight buffers 610a-610k. For example, increasing the quantity of weight buffers 610a-610k included in the AI accelerator device 110 (which decreases the quantity of the columns 606a-606l associated with each of the weight buffers 610a-610k) may decrease latency and energy consumption in the AI accelerator device 110 at the expense of increased size of the AI accelerator device 110. As another example, decreasing the quantity of weight buffers 610a-610k included in the AI accelerator device 110 (which increases the quantity of the columns 606a-606l associated with each of the weight buffers 610a-610k) may decrease the size of the AI accelerator device 110 at the expense of increased latency and energy consumption in the AI accelerator device 110.

Each of the accumulator buffers 620a-620y may be associated with, and may receive an output (e.g., a partial sum) from, a subset of the columns 606a-606l of processing element circuits 604a-604n included in the processing element array 602. In some implementations, each of the accumulator buffers 620a-620y may be associated with, and may receive an output from, a single respective column of the columns 606a-606l. For example, the accumulator buffer 620a may be associated with, and may receive an output from, the column 606a; the accumulator buffer 620b may be associated with, and may receive an output from, the column 606b; and so on. In some implementations, each of the accumulator buffers 620a-620y may be associated with, and may receive an output from, a plurality of columns of the columns 606a-606l.

The quantity of accumulator buffers 620a-620y included in the AI accelerator device 110, and the quantity of the columns 606a-606l associated with each accumulator buffer, may be selected to satisfy one or more parameters, such as energy consumption of the accumulator buffers 620a-620y, latency of the accumulator buffers 620a-620y, and/or the physical footprint of the accumulator buffers 620a-620y. For example, increasing the quantity of accumulator buffers 620a-620y included in the AI accelerator device 110 (which decreases the quantity of the columns 606a-606l associated with each of the accumulator buffers 620a-620y) may decrease latency and energy consumption in the AI accelerator device 110 at the expense of increased size of the AI accelerator device 110. As another example, decreasing the quantity of accumulator buffers 620a-620y included in the AI accelerator device 110 (which increases the quantity of the columns 606a-606l associated with each of the accumulator buffers 620a-620y) may decrease the size of the AI accelerator device 110 at the expense of increased latency and energy consumption in the AI accelerator device 110.

As indicated above, FIG. 6 is provided as an example. Other examples may differ from what is described with regard to FIG. 6.

Figure 7:
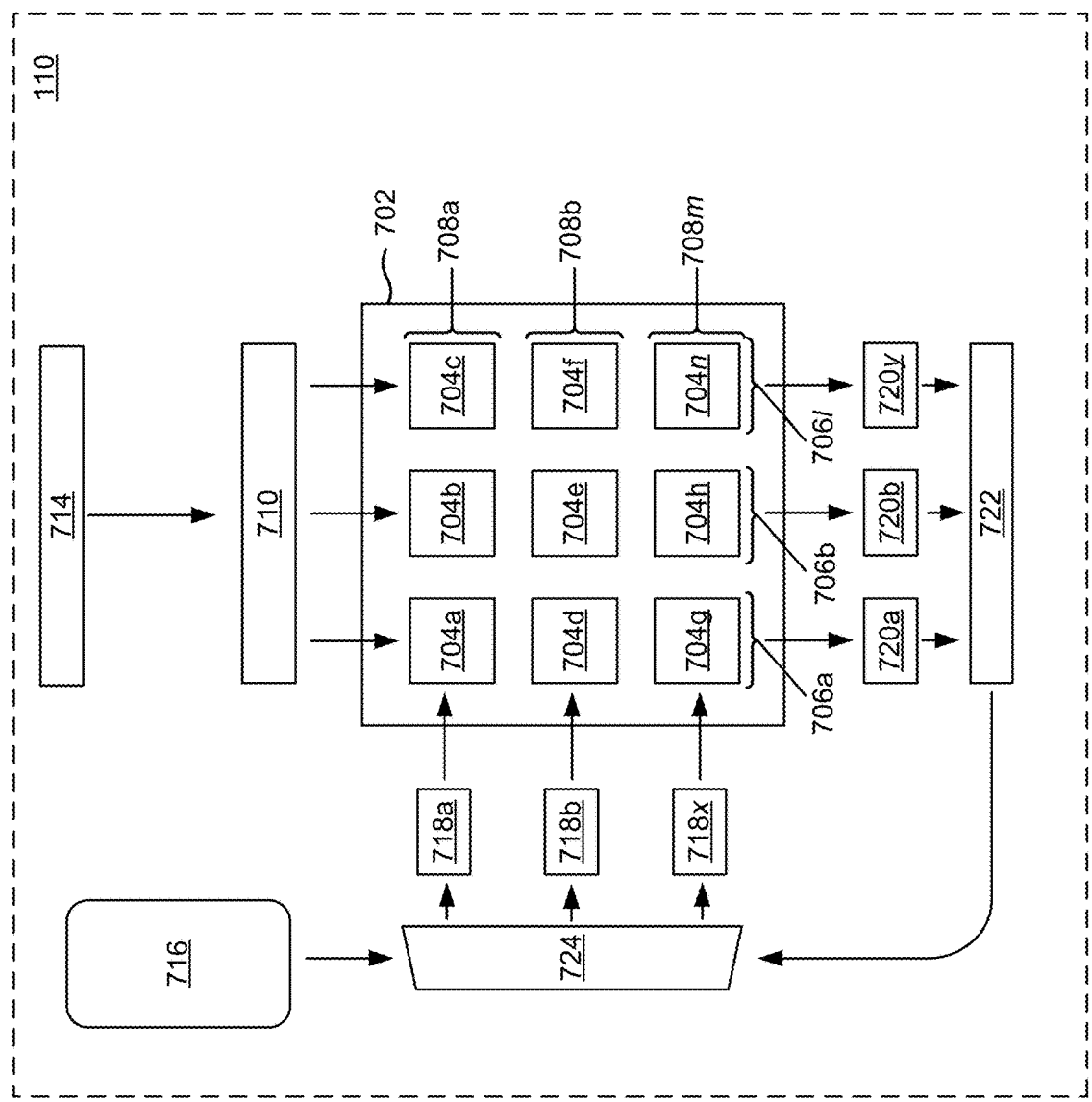

FIG. 7 is a diagram of an example implementation 700 of an AI accelerator device 110 described herein. The example implementation 700 of the AI accelerator device 110 is similar to the example implementation 200 of the AI accelerator device 110, and includes components 702-710 and 714-724 that are similar to the components 202-210 and 214-224 of the example implementation 200 of the AI accelerator device 110. However, in the example implementation 700 of the AI accelerator device 110, a single monolithic weight buffer 710 is included as opposed to a plurality of weight buffers 210a-210k (e.g., a plurality of mini weight buffers), and a plurality of activation buffers 718a-718x (e.g., a plurality of mini activation buffers) and a plurality of accumulator buffers 720a-720y (e.g., a plurality of mini accumulator buffers) are both included. The plurality of activation buffers 718a-718x (e.g., a plurality of mini activation buffers) and the plurality of accumulator buffers 720a-720y (e.g., a plurality of mini accumulator buffers) may be included to reduce the latency and energy consumption of both the activation buffer and the accumulator buffer of the AI accelerator device 110 relative to the latency and energy consumption of a single monolithic activation buffer and a single monolithic accumulator buffer.

Each of the activation buffers 718a-718x may be associated with, and may provide input data to, a subset of the rows 708a-708m of processing element circuits 704a-704n included in the processing element array 702. In some implementations, each of the activation buffers 718a-718x may be associated with, and may provide input data to, a single respective row of the rows 708a-708m. For example, the activation buffer 718a may be associated with, and may provide input data to, the row 708a; the activation buffer 718b may be associated with, and may provide input data to, the row 708b; and so on. In some implementations, each of the activation buffers 718a-718x may be associated with, and may provide input data to, a plurality of rows of the rows 708a-708m.

The quantity of activation buffers 718a-718x included in the AI accelerator device 110, and the quantity of the rows 708a-708m associated with each activation buffer, may be selected to satisfy one or more parameters, such as energy consumption of the activation buffers 718a-718x, latency of the activation buffers 718a-718x, and/or the physical footprint of the activation buffers 718a-718x. For example, increasing the quantity of activation buffers 718a-718x included in the AI accelerator device 110 (which decreases the quantity of the rows 708a-708m associated with each of the activation buffers 718a-718x) may decrease latency and energy consumption in the AI accelerator device 110 at the expense of increased size of the AI accelerator device 110. As another example, decreasing the quantity of activation buffers 718a-718x included in the AI accelerator device 110 (which increases the quantity of the rows 708a-708m associated with each of the activation buffers 718a-718x) may decrease the size of the AI accelerator device 110 at the expense of increased latency and energy consumption in the AI accelerator device 110.

Each of the accumulator buffers 720a-720y may be associated with, and may receive an output (e.g., a partial sum) from, a subset of the columns 706a-706l of processing element circuits 704a-704n included in the processing element array 702. In some implementations, each of the accumulator buffers 720a-720y may be associated with, and may receive an output from, a single respective column of the columns 706a-706l. For example, the accumulator buffer 720a may be associated with, and may receive an output from, the column 706a; the accumulator buffer 720b may be associated with, and may receive an output from, the column 706b; and so on. In some implementations, each of the accumulator buffers 720a-720y may be associated with, and may receive an output from, a plurality of columns of the columns 706a-706l.

The quantity of accumulator buffers 720a-720y included in the AI accelerator device 110, and the quantity of the columns 706a-706l associated with each activation buffer, may be selected to satisfy one or more parameters, such as energy consumption of the accumulator buffers 720a-720y, latency of the accumulator buffers 720a-720y, and/or the physical footprint of the accumulator buffers 720a-720y. For example, increasing the quantity of accumulator buffers 720a-720y included in the AI accelerator device 110 (which decreases the quantity of the columns 706a-706l associated with each of the accumulator buffers 720a-720y) may decrease latency and energy consumption in the AI accelerator device 110 at the expense of increased size of the AI accelerator device 110. As another example, decreasing the quantity of accumulator buffers 720a-720y included in the AI accelerator device 110 (which increases the quantity of the columns 706a-706l associated with each of the accumulator buffers 720a-720y) may decrease the size of the AI accelerator device 110 at the expense of increased latency and energy consumption in the AI accelerator device 110.

As indicated above, FIG. 7 is provided as an example. Other examples may differ from what is described with regard to FIG. 7.

Figure 8:
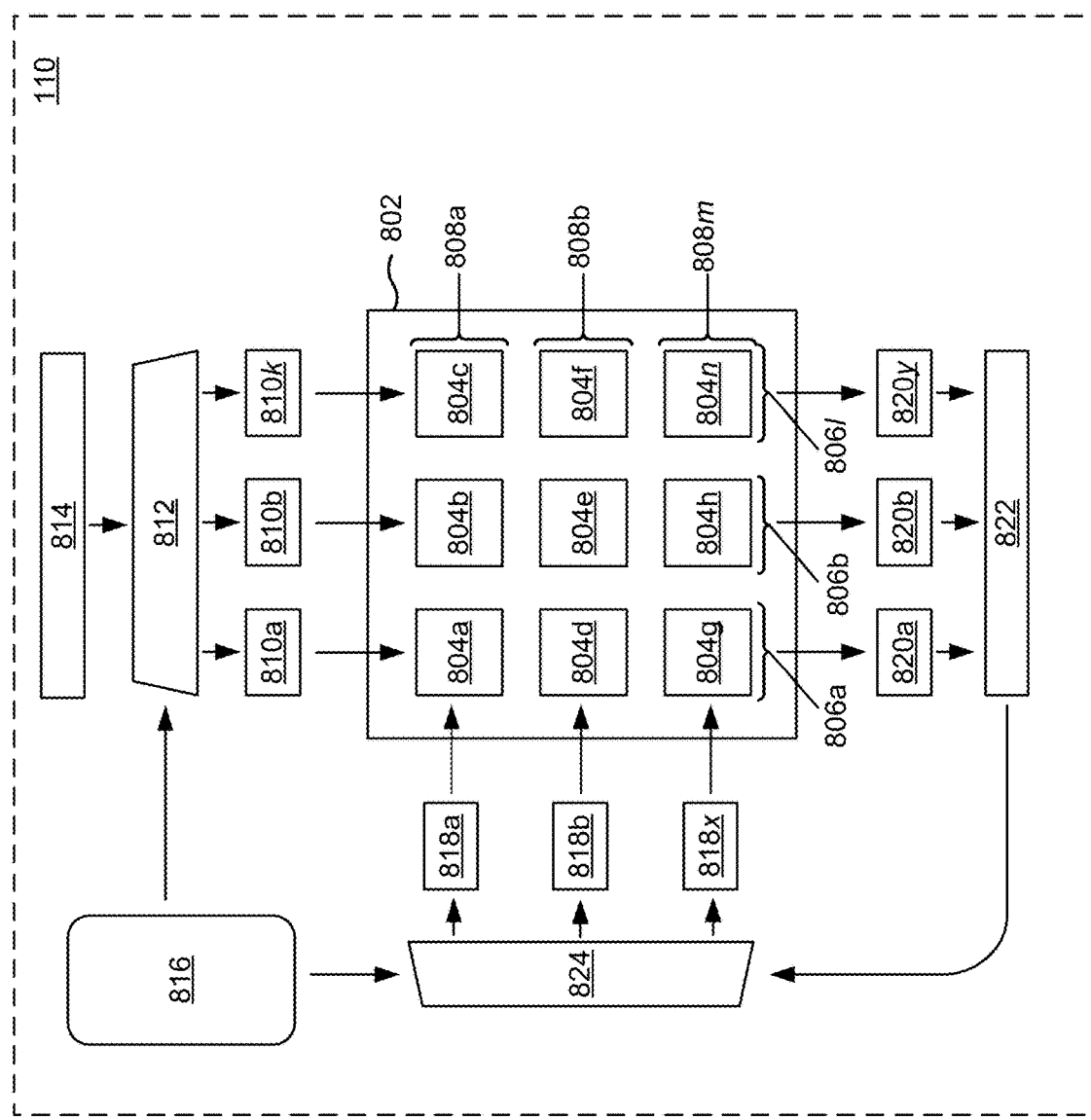

FIG. 8 is a diagram of an example implementation 800 of an AI accelerator device 110 described herein. The example implementation 800 of the AI accelerator device 110 is similar to the example implementation 200 of the AI accelerator device 110, and includes components 802-824 that are similar to the components 202-224 of the example implementation 200 of the AI accelerator device 110. However, in the example implementation 800 of the AI accelerator device 110, a plurality of weight buffers 810a-810k (e.g., a plurality of mini weight buffers), a plurality of activation buffers 818a-818x (e.g., a plurality of mini activation buffers), a plurality of accumulator buffers 820a-820y (e.g., a plurality of mini accumulator buffers) are both included. The plurality of weight buffers 810a-810k (e.g., a plurality of mini weight buffers), the plurality of activation buffers 818a-818x (e.g., a plurality of mini activation buffers), and the plurality of accumulator buffers 820a-820y (e.g., a plurality of mini accumulator buffers) may be included to reduce the latency and energy consumption of the weight buffer, the activation buffer, and the accumulator buffer of the AI accelerator device 110 relative to the latency and energy consumption of a single monolithic weight buffer, a single monolithic activation buffer, and a single monolithic accumulator buffer.

Each of the weight buffers 810a-810k may be associated with, and may receive an output (e.g., a partial sum) from, a subset of the columns 806a-806l of processing element circuits 804a-804n included in the processing element array 802. In some implementations, each of the weight buffers 810a-810k may be associated with, and may provide weights to, a single respective column of the columns 806a-806l. For example, the weight buffer 810a may be associated with, and may provide weights to, the column 806a; the weight buffer 810b may be associated with, and may receive provide weights to, the column 806b; and so on. In some implementations, each of the weight buffers 810a-810k may be associated with, and may provide weights to, a plurality of columns of the columns 806a-806l.

The quantity of weight buffers 810a-810k included in the AI accelerator device 110, and the quantity of the columns 806a-806l associated with each weight buffer, may be selected to satisfy one or more parameters, such as energy consumption of the weight buffers 810a-810k, latency of the weight buffers 810a-810k, and/or the physical footprint of the weight buffers 810a-810k. For example, increasing the quantity of weight buffers 810a-810k included in the AI accelerator device 110 (which decreases the quantity of the columns 806a-806l associated with each of the weight buffers 810a-810k) may decrease latency and energy consumption in the AI accelerator device 110 at the expense of increased size of the AI accelerator device 110. As another example, decreasing the quantity of weight buffers 810a-810k included in the AI accelerator device 110 (which increases the quantity of the columns 806a-806l associated with each of the weight buffers 810a-810k) may decrease the size of the AI accelerator device 110 at the expense of increased latency and energy consumption in the AI accelerator device 110.

Each of the activation buffers 818a-818x may be associated with, and may provide input data to, a subset of the rows 808a-808m of processing element circuits 804a-804n included in the processing element array 802. In some implementations, each of the activation buffers 818a-818x may be associated with, and may provide input data to, a single respective row of the rows 808a-808m. For example, the activation buffer 818a may be associated with, and may provide input data to, the row 808a; the activation buffer 818b may be associated with, and may provide input data to, the row 808b; and so on. In some implementations, each of the activation buffers 818a-818x may be associated with, and may provide input data to, a plurality of rows of the rows 808a-808m.

The quantity of activation buffers 818a-818x included in the AI accelerator device 110, and the quantity of the rows 808a-808m associated with each activation buffer, may be selected to satisfy one or more parameters, such as energy consumption of the activation buffers 818a-818x, latency of the activation buffers 818a-818x, and/or the physical footprint of the activation buffers 818a-818x. For example, increasing the quantity of activation buffers 818a-818x included in the AI accelerator device 110 (which decreases the quantity of the rows 808a-808m associated with each of the activation buffers 818a-818x) may decrease latency and energy consumption in the AI accelerator device 110 at the expense of increased size of the AI accelerator device 110.

As another example, decreasing the quantity of activation buffers 818a-818x included in the AI accelerator device 110 (which increases the quantity of the rows 808a-808m associated with each of the activation buffers 818a-818x) may decrease the size of the AI accelerator device 110 at the expense of increased latency and energy consumption in the AI accelerator device 110.

Each of the accumulator buffers 820a-820y may be associated with, and may receive an output (e.g., a partial sum) from, a subset of the columns 806a-806l of processing element circuits 804a-804n included in the processing element array 802. In some implementations, each of the accumulator buffers 820a-820y may be associated with, and may receive an output from, a single respective column of the columns 806a-806l. For example, the accumulator buffer 820a may be associated with, and may receive an output from, the column 806a; the accumulator buffer 820b may be associated with, and may receive an output from, the column 806b; and so on. In some implementations, each of the accumulator buffers 820a-820y may be associated with, and may receive an output from, a plurality of columns of the columns 806a-806l.

The quantity of accumulator buffers 820a-820y included in the AI accelerator device 110, and the quantity of the columns 806a-806l associated with each accumulator buffer, may be selected to satisfy one or more parameters, such as energy consumption of the accumulator buffers 820a-820y, latency of the accumulator buffers 820a-820y, and/or the physical footprint of the accumulator buffers 820a-820y. For example, increasing the quantity of accumulator buffers 820a-820y included in the AI accelerator device 110 (which decreases the quantity of the columns 806a-806l associated with each of the accumulator buffers 820a-820y) may decrease latency and energy consumption in the AI accelerator device 110 at the expense of increased size of the AI accelerator device 110. As another example, decreasing the quantity of accumulator buffers 820a-820y included in the AI accelerator device 110 (which increases the quantity of the columns 806a-806l associated with each of the accumulator buffers 820a-820y) may decrease the size of the AI accelerator device 110 at the expense of increased latency and energy consumption in the AI accelerator device 110.

In some implementations, the mapping between weight buffers 810a-810k and the columns 806a-806l, the mapping between activation buffers 818a-818x and the rows 808a-808m, and the mapping between accumulator buffers 820a-820y and the columns 806a-806l may be the same mapping. For example, each of the weight buffers 810a-810k may be associated with a single column of the columns 806a-806l, each of the activation buffers 818a-818x may be associated with a single row of the rows 808a-808m, and each of the accumulator buffers 820a-820y may be associated with a single column of the columns 806a-806l. As another example, each of the weight buffers 810a-810k may be associated with a first quantity of the columns 806a-806l, each of the activation buffers 818a-818x may be associated with a second quantity of the rows 808a-808m, and each of the accumulator buffers 820a-820y may be associated with a third quantity of the columns 806a-806l, where the first quantity, the second quantity, and the third quantity are the same quantity.

In some implementations, two or more of the mapping between weight buffers 810a-810k and the columns 806a-806l, the mapping between activation buffers 818a-818x and the rows 808a-808m, and/or the mapping between accumulator buffers 820a-820y and the columns 806a-806l may be different mappings. To illustrate, for example, each of the weight buffers 810a-810k may be associated with a single column of the columns 806a-806l, each of the activation buffers 818a-818x may be associated with three (3) rows of the rows 808a-808m, and each of the accumulator buffers 820a-820y may be associated with five (5) columns of the columns 806a-806l.

In some implementations, the mapping between two or more of the weight buffers 810a-810k and the columns 806a-806l, the mapping between two or more of the activation buffers 818a-818x and the rows 808a-808m, and/or the mapping between two or more of the accumulator buffers 820a-820y and the columns 806a-806l may be different mappings. For example, the weight buffer 810a may be associated with a single column of the columns 806a-806l, the weight buffer 810b may be associated with six (6) columns of the columns 806a-806l, and the weight buffer 810k may be associated with eight (8) columns of the columns 806a-806l.

In some implementations, the quantity of columns mapped to each of the weight buffers 810a-810k is greater relative to the quantity of rows mapped to each of the activation buffers 818a-818x and/or is greater relative to the quantity of columns mapped to each of the accumulator buffers 820a-820y. In some implementations, the quantity of rows mapped to each of the activation buffers 818a-818x is greater relative to the quantity of columns mapped to each of the weight buffers 810a-810k and/or is greater relative to the quantity of columns mapped to each of the accumulator buffers 820a-820y. In some implementations, the quantity of columns mapped to each of the accumulator buffers 820a-820y is greater relative to the quantity of rows mapped to each of the activation buffers 818a-818x and/or is greater relative to the quantity of columns mapped to each of the weight buffers 810a-810k.

In some implementations, the quantity of weight buffers 810a-810k is greater relative to the quantity of activation buffers 818a-818x and/or is greater relative to the quantity of accumulator buffers 820a-820y. In some implementations, the quantity of activation buffers 818a-818x is greater relative to the quantity of weight buffers 810a-810k and/or is greater relative to the quantity of accumulator buffers 820a-820y. In some implementations, the quantity of accumulator buffers 820a-820y is greater relative to the quantity of activation buffers 818a-818x and/or is greater relative to the quantity of weight buffers 810a-810k.

As indicated above, FIG. 8 is provided as an example. Other examples may differ from what is described with regard to FIG. 8.

Figure 9:
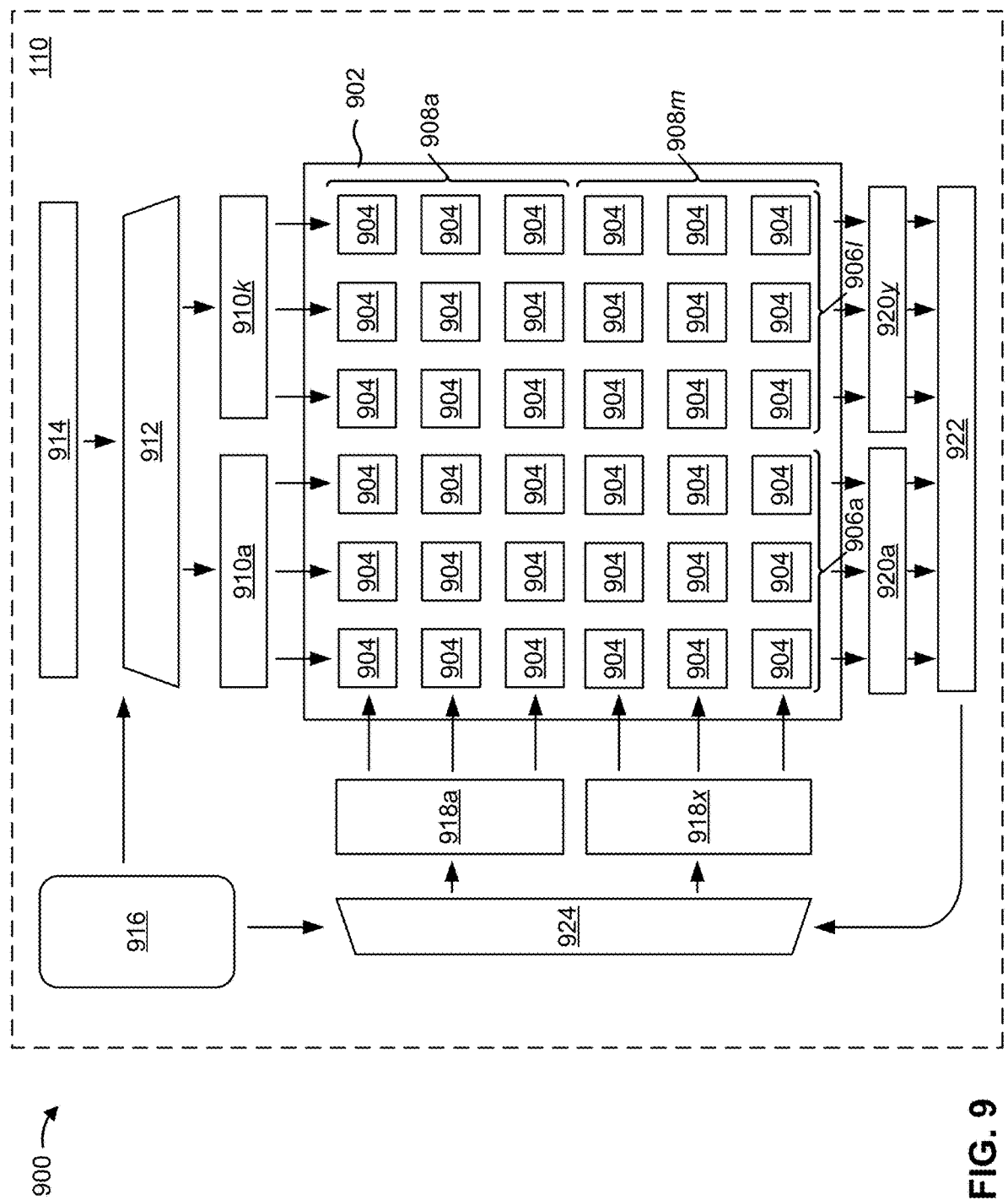

FIG. 9 is a diagram of an example implementation 900 of an AI accelerator device 110 described herein. The example implementation 900 of the AI accelerator device 110 is similar to the example implementation 800 of the AI accelerator device 110, and includes components 902-924 that are similar to the components 802-824 of the example implementation 800 of the AI accelerator device 110.

In the example implementation 900 of the AI accelerator device 110, the weight buffer 910a is associated with a subset 906a of the columns of the processing element array 902, the weight buffer 910k is associated with a subset 906l of the columns of the processing element array 902, and so on, where each subset 906a-906k includes a plurality of columns. Each column in the subset 906a is exclusive to the subset 906a and is not included in another subset of columns, each column in the subset 906l is exclusive to the subset 906l and is not included in another subset of columns, and so on.

In the example implementation 900 of the AI accelerator device 110, the activation buffer 918a is associated with a subset 908a of the rows of the processing element array 902, the activation buffer 918x is associated with a subset 908m of the rows of the processing element array 902, and so on, where each subset 908a-908m includes a plurality of rows. Each row in the subset 908a is exclusive to the subset 908a and is not included in another subset of rows, each row in the subset 908m is exclusive to the subset 908m and is not included in another subset of rows, and so on.

In the example implementation 900 of the AI accelerator device 110, the accumulator buffer 920a is associated with a subset 906a of the columns of the processing element array 902, the accumulator buffer 910x is associated with a subset 906l of the columns of the processing element array 902, and so on, where each subset 906a-906l includes a plurality of columns. Each column in the subset 906a is exclusive to the subset 906a and is not included in another subset of columns, each column in the subset 906l is exclusive to the subset 906l and is not included in another subset of columns, and so on.

As indicated above, FIG. 9 is provided as an example. Other examples may differ from what is described with regard to FIG. 9.

Figure 10A:
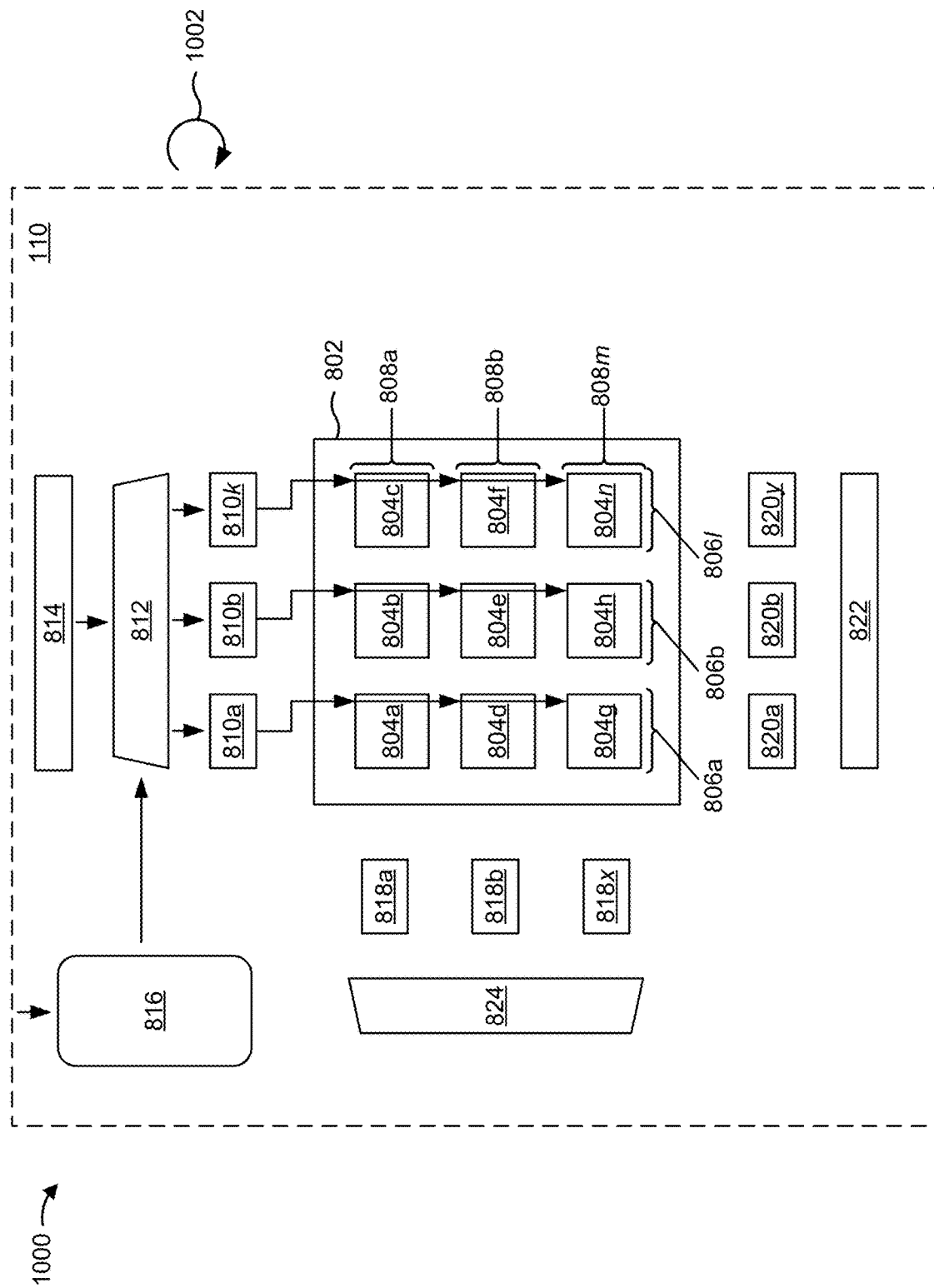
Figure 10B:
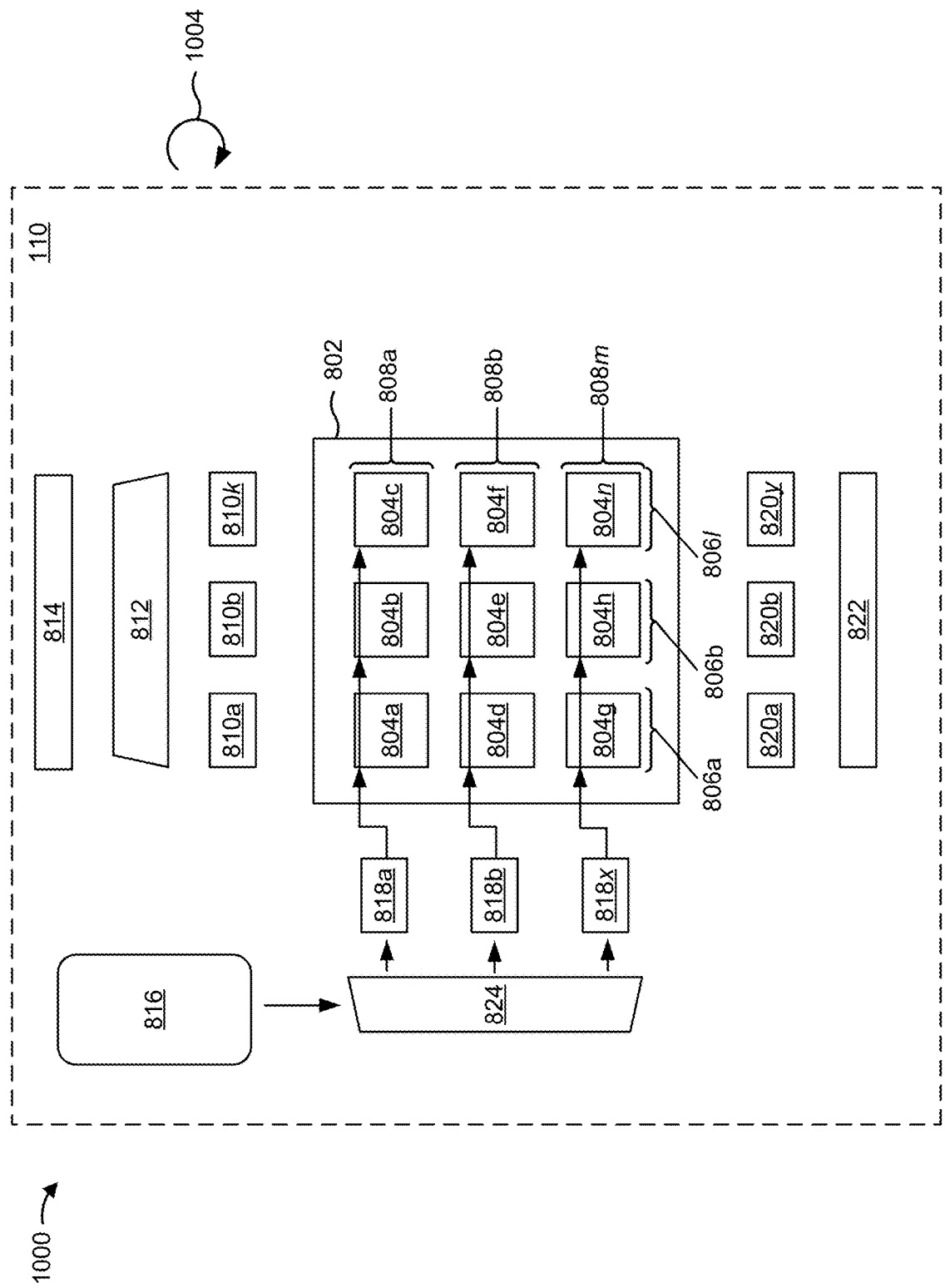

FIGS. 10A-10C are diagrams of an example implementation 1000 described herein. The example implementation 1000 includes an example operational flow of an AI accelerator device 110 described herein. The example implementation 1000 is illustrated in connection with the example implementation 800 of the AI accelerator device 110 of FIG. 8. However, the example operational flow (or portions thereof) of an AI accelerator device 110 may be performed by another example implementation of the AI accelerator device 110 described herein.

In some implementations, the operational flow is performed to perform neural network processing operations in the AI accelerator device 110. For example, the operational flow may be performed as a part of a machine learning operation to train the processing element circuits 804a-804n and to update or modify the weights associated with the processing element circuits 804a-804n. As another example, the operation flow may be performed to perform an inference in which the AI accelerator device 110 classifies objects in a large data set, in which the AI accelerator device 110 performs computer vision operations, and/or in which the AI accelerator device 110 performs other complex and/or large-scale operations using a neural network. In some implementations, the operation flow is performed based on receiving a request or a query from a client device (e.g., from one or more of the client devices 130-170) over a network 120. The request may be provided to the edge computing system 101, and the edge computing system 101 may use the AI accelerator device 110 to satisfy the request.

As shown in FIG. 10A, the AI accelerator device 110 may use the plurality of weight buffers 810a-810k to provide weights to the columns 808a-808m of processing element circuits 804a-804n of the processing element array 802. For example, the weight buffer 810a may provide weights to the processing element circuits 804a, 804d, and 804g in the column 806a; the weight buffer 810b may provide weights to the processing element circuits 804b, 804e, and 804h in the column 806b; the weight buffer 810k may provide weights to the processing element circuits 804c, 804f, and 804n in the column 806l; and so on. The weights may be stored in the memory device 814. The plurality of weight buffers 810a-810k may obtain the weights from the memory device 814 and may buffer (e.g., temporarily store) the weights in the plurality of weight buffers 810a-810k to reduce latency in the operational flow.

As further shown in FIG. 10A, at 1002, the weights may be provided from the memory device 814 to the plurality of weight buffers 810a-810k through the weight buffer multiplexer circuit 812. The weight buffer multiplexer circuit 812 enables the weights to be directed to specific ones of the plurality of weight buffers 810a-810k and, therefore, specific ones of the columns 806a-806l. The distributor circuit 816 may receive a dataflow select signal (DF_SEL) (e.g., from the one or more processors 107) as input, and may generate one or more types of select signals based on the dataflow select signal. For example, the distributor circuit 816 may generate one or more weight select signals and may provide the one or more weight select signals to the weight buffer multiplexer circuit 812. The one or more weight select signals may cause the weight buffer multiplexer circuit 812 to provide weights to specific ones of the plurality of weight buffers 810a-810k. This enables the weights to be loaded from external memory (e.g., the memory device 814), to the plurality of weight buffers 810a-810k, and then from the plurality of weight buffers 810a-810k, to the specific ones of the columns 806a-806l.

As shown in FIG. 10B, at 1004, the AI accelerator device 110 may use the plurality of activation buffers 818a-818x to provide input data (e.g., partial sums, values to be multiplied) to the rows 808a-808m of processing element circuits 804a-804n of the processing element array 802. For example, the activation buffer 818a may provide input data to the processing element circuits 804a-804c in the row 808a; the activation buffer 818b may provide input data to the processing element circuits 804d-804f in the row 808b; the activation buffer 818x may provide input data to the processing element circuits 804g-804n in the row 808m; and so on. The activation buffers 818a-818x may obtain the input data from the peripheral circuitry 822 and may buffer (e.g., temporarily store) the input data in the activation buffers 818a-818x to reduce latency in the operational flow.

As further shown in FIG. 10B, at 1004, the input may be provided to the activation buffers 818a-818x through the activation buffer multiplexer circuit 824. The activation buffer multiplexer circuit 824 enables the input data to be directed to specific ones of the plurality of activation buffers 818a-818x and, therefore, specific ones of the rows 808a-808m. The distributor circuit 816 may generate one or more types of select signals based on the dataflow select signal. For example, the distributor circuit 816 may generate one or more activation select signals and may provide the one or more activation select signals to the activation buffer multiplexer circuit 824. The one or more activation select signals may cause the activation buffer multiplexer circuit 824 to provide the input data to specific ones of the plurality of activation buffers 818a-818x.

As shown in FIG. 10C, at 1006, each of the processing element circuits 804a-804n in the processing element array 802 may perform one or more neural network operations (e.g., a MAC operation and/or another type of neural network operation) to generate an updated partial sum. The element circuits 804a-804n may perform the one or more neural network operations in a parallel or semi-parallel manner. The updated partial sums are buffered (e.g., temporarily stored) in the plurality of accumulator buffers 820a-820y. For example, the updated partial sums from the processing element circuits 804a, 804d, and 804g in the column 806a may be provided to (and buffered in) the accumulator buffer 820a; the updated partial sums from processing element circuits 804b, 804e, and 804h in the column 806b may be provided to (and buffered in) the accumulator buffer 820b; the updated partial sums from processing element circuits 804c, 804f, and 804n in the column 806l may be provided to (and buffered in) the accumulator buffer 820y; and so on. The plurality of accumulator buffers 820a-820y may provide the updated partial sums to the peripheral circuitry 822.

As indicated above, FIGS. 10A-10C are provided as an example. Other examples may differ from what is described with regard to FIGS. 10A-10C.

Figure 11:
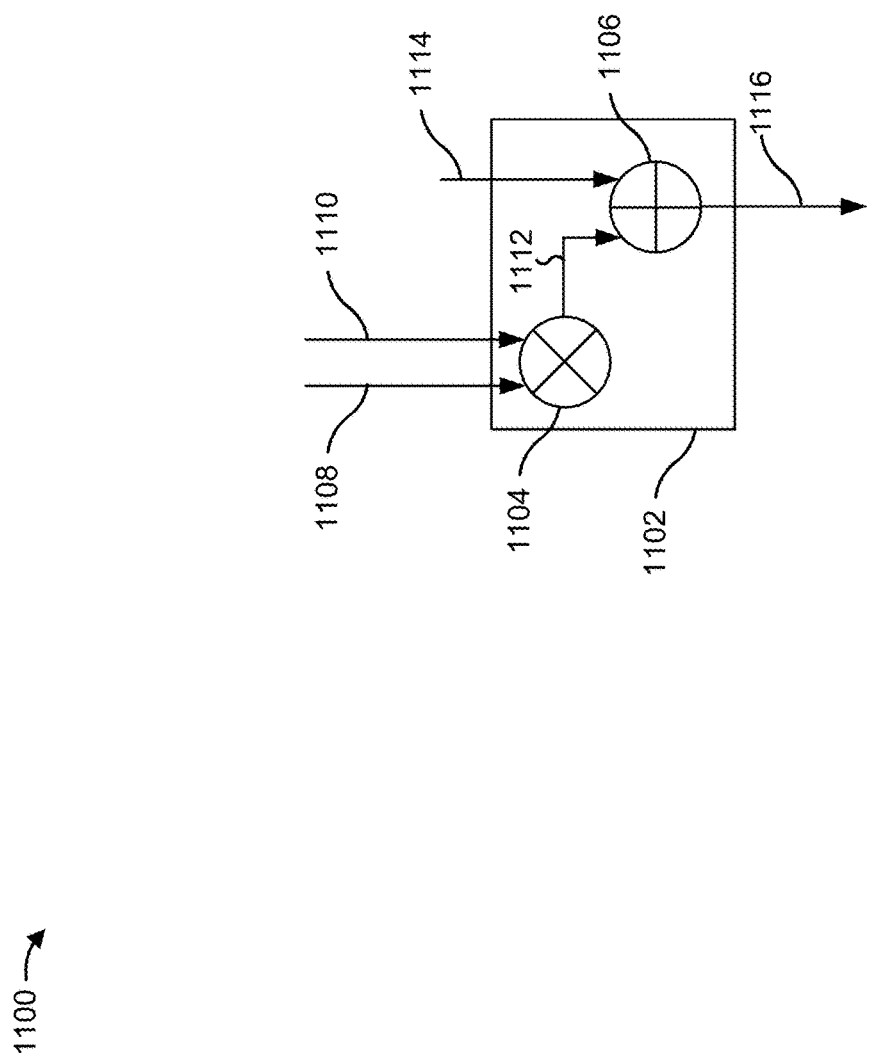
FIG. 11 is a diagram of an example implementation of a processing element circuit described herein.

FIG. 11 is a diagram of an example implementation 1100 of a processing element circuit described herein. For example, the example implementation 1100 may include an example MAC operation performed by a processing element circuit of the processing element circuits 202a-202n, the processing element circuits 302a-302n, the processing element circuits 402a-402n, the processing element circuits 502a-502n, the processing element circuits 602a-602n, the processing element circuits 702a-702n, the processing element circuits 802a-802n, and/or the processing element circuits 904, among other examples. The MAC operation (also referred to as a weight sum operation) may be performed, for example, as part of the operational flow of the example implementation 1000 (e.g., at 1006).

As shown in FIG. 11, a processing element circuit 1102 may include a multiplier circuit 1104 and an accumulator circuit 1106. The multiplier circuit 1104 may receive a plurality of inputs 1108 and 1110, and may perform the multiplication aspect of the MAC operation based on the inputs 1108 and 1110. In particular, the multiplier circuit 1104 may multiply the inputs 1108 and 1110 together to generate an intermediate output 1112. The inputs 1108 and 1110 may include values to be multiplied, a weight, and/or another type of input.

The intermediate output 1112 may be provided to the accumulator circuit 1106. The accumulator circuit 1106 may perform an accumulate operation, in which the intermediate output 1112 and an input 1114 (e.g., a partial sum) are added together to generate an updated partial sum 1116. The input 1114 (e.g., the partial sum) may be provided spatially from a neighboring processing element circuit 1102 or temporally from a previous MAC operation performed by the processing element circuit 1102.

As indicated above, FIG. 11 is provided as an example. Other examples may differ from what is described with regard to FIG. 11.

Figure 12:
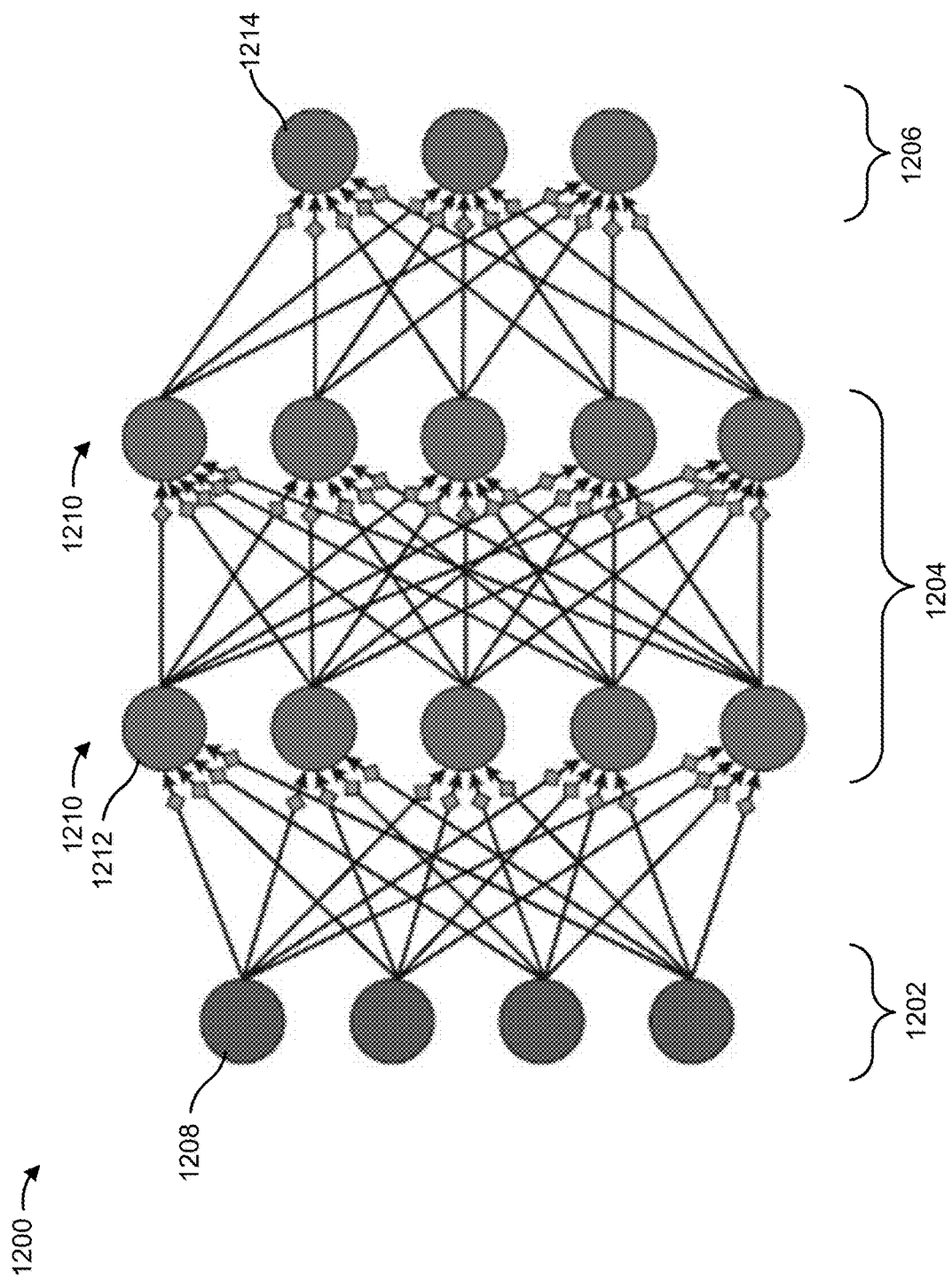
FIG. 12 is a diagram of an example neural network described herein.

FIG. 12 is a diagram of an example neural network 1200 described herein. FIG. 12 illustrates a conceptual diagram of the neural network 1200 (e.g., an artificial neural network, a deep neural network), which may be implemented by an AI accelerator device 110 described herein.

As shown in FIG. 12, the neural network 1200 includes an input layer 1202, a hidden layer 1204, and an output layer 1206. The input layer 1202 may include nodes 1208, which provide inputs to one or more activation layers 1210. The activation layers 1210 include nodes 1212 that are implemented by processing element circuits described herein, such as the processing element circuits 202a-202n, the processing element circuits 302a-302n, the processing element circuits 402a-402n, the processing element circuits 502a-502n, the processing element circuits 602a-602n, the processing element circuits 702a-702n, the processing element circuits 802a-802n, the processing element circuits 904, and/or the processing element circuit 1102, among other examples. Each of the nodes 1212 may receive an input and may perform a MAC operation or another type of neural network operation based on the input. Each of the nodes 1212 may provide an output (e.g., an updated partial sum) to the next layer in the neural network, which may include another activation layer 1210 or the output layer 1206 that includes nodes 1214.

As indicated above, FIG. 12 is provided as an example. Other examples may differ from what is described with regard to FIG. 12.

Figure 13A:
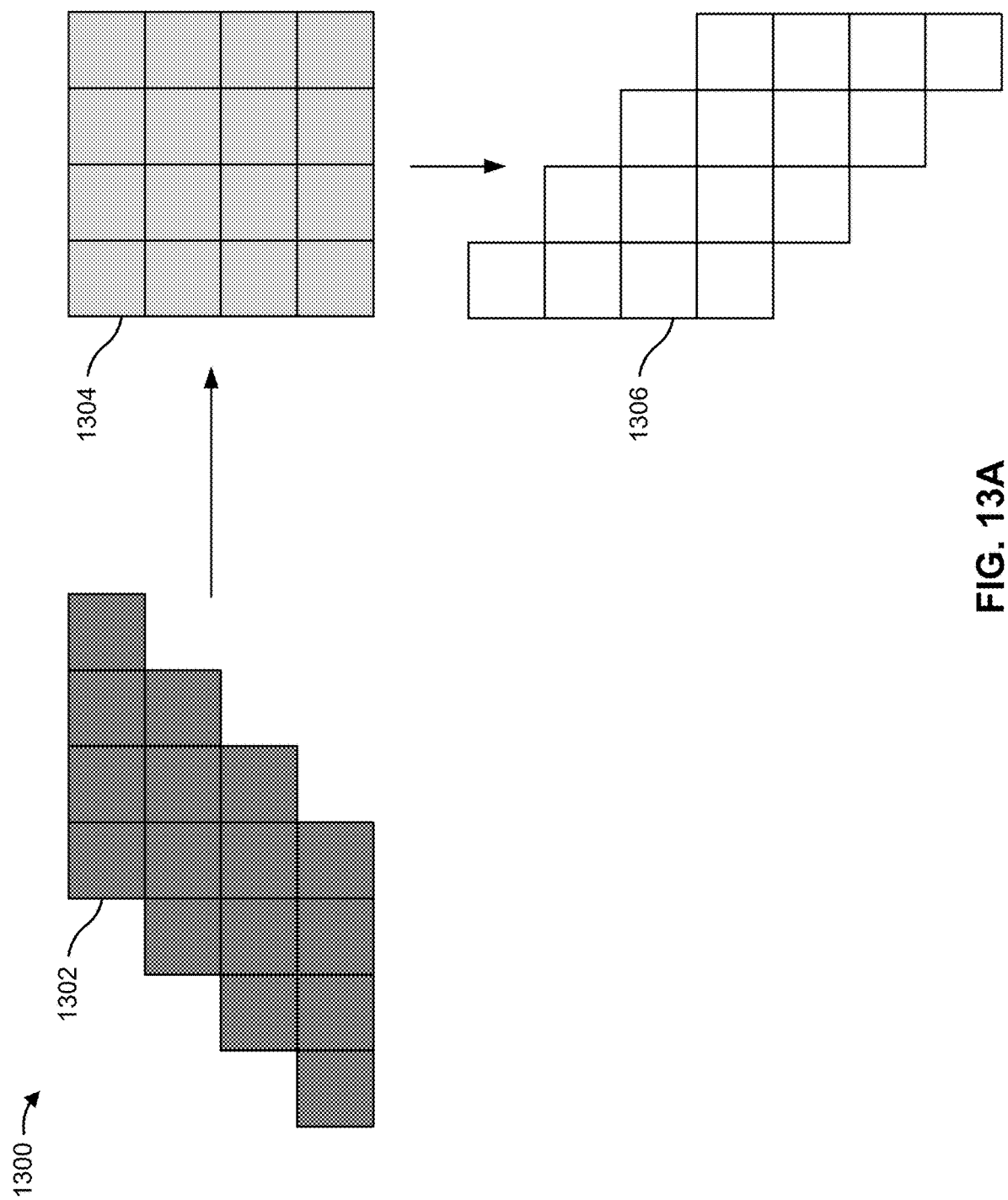
FIGS. 13A-13C are diagrams of example implementations of neural network dataflows described herein.
Figure 13B:
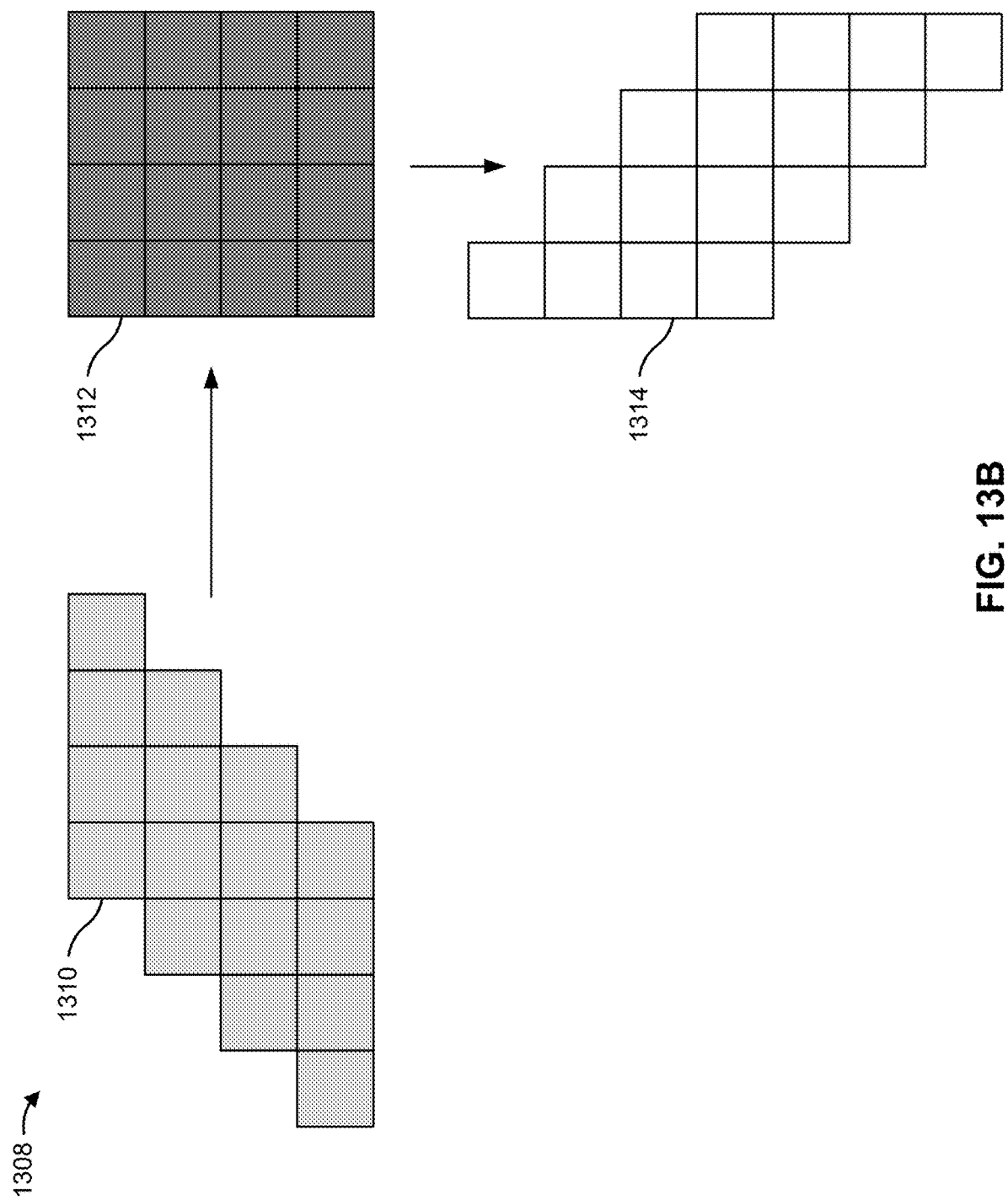
Figure 13C:
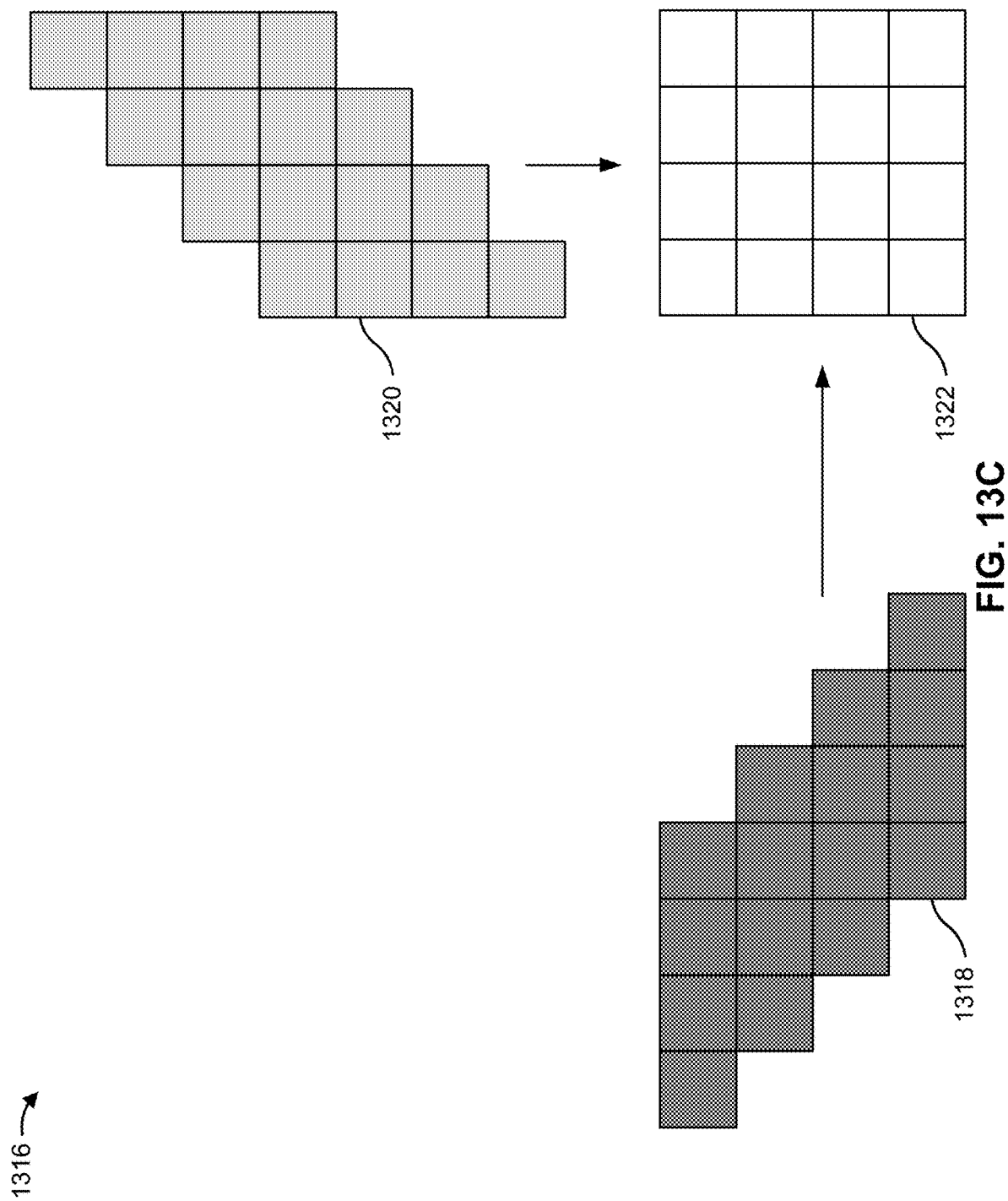

FIGS. 13A-13C are diagrams of example implementations of neural network dataflows described herein. In some implementations, an AI accelerator device 110 described herein may be configured to perform one or more of the neural network dataflows described in connection with FIGS. 13A-13C.

FIG. 13A illustrates an example implementation 1300 of a weight stationary dataflow. In the weight stationary dataflow, input feature maps (IFMAPs) 1302 may be arranged in rows. Each row of IFMAPs 1302 may be stored in a respective activation buffer (e.g., in a respective activation mini buffer described herein) and provided to a corresponding row of processing element circuits in a processing element array 1304. Weights may be provided (e.g., by a weight buffer or a plurality of weight mini buffers described herein) to the processing element array 1304 and pre-filled in each processing element circuit in the processing element array 1304 prior to the start of a computation using the weights and the IFMAPs 1302. The weights may be pre-filled such that all of the elements of a given filter in the processing element array 1304 are allocated along a column, meaning that each column of the processing element array 1304 receives weights from a dedicated weight buffer.

Partial sums are generated by the processing element circuits based on the IFMAPs 1302 and the pre-filled weights. In some implementations, the processing element circuits may generate one partial sum per cycle. The generated partial sums may then be reduced across the rows of the processing element array 1304, along with each column in parallel to generate one output feature map (OFMAP) 1306 pixel per column. Each OFMAP column may be assigned to a respective accumulator buffer (e.g., a respective accumulator mini buffer described herein).

FIG. 13B illustrates an example implementation 1308 of an input stationary dataflow. The input stationary dataflow is similar to the weight stationary dataflow, except that the weights 1310 are streamed into the processing element array 1312 in which the IFMAPs are pre-filled in the processing element circuits of the processing element array 1312. The weights 1310 are streamed from the edge of the processing element array 1312, and each processing element circuit of the processing element array 1312 generates a partial sum each cycle based on the weights 1310 and the unrolled IFMAPs.

The generated partial sums may then be reduced across the rows of the processing element array 1312, along with each column in parallel to generate one OFMAP 1314 pixel per column. Each OFMAP column may be assigned to a respective accumulator buffer (e.g., a respective accumulator mini buffer described herein).

FIG. 13C illustrates an example implementation 1316 of an output stationary dataflow. An output stationary dataflow refers to a mapping in which each processing element circuit performs all of the computations for one OFMAP while IFMAPs 1318 and weights 1320 are fed from the edges of the processing element array 1322 and distributed to the processing element circuits using processing element interconnects. Partial sums are generated and reduced within each processing element circuit in the processing element array 1322. Once all of the processing element circuits in the processing element array 1322 complete the generation of OFMAPs, the results are transferred out of the processing element array 1322 through the processing element interconnects.

As indicated above, FIGS. 13A-13C is provided as an example. Other examples may differ from what is described with regard to FIGS. 13A-13C.

Figure 14:
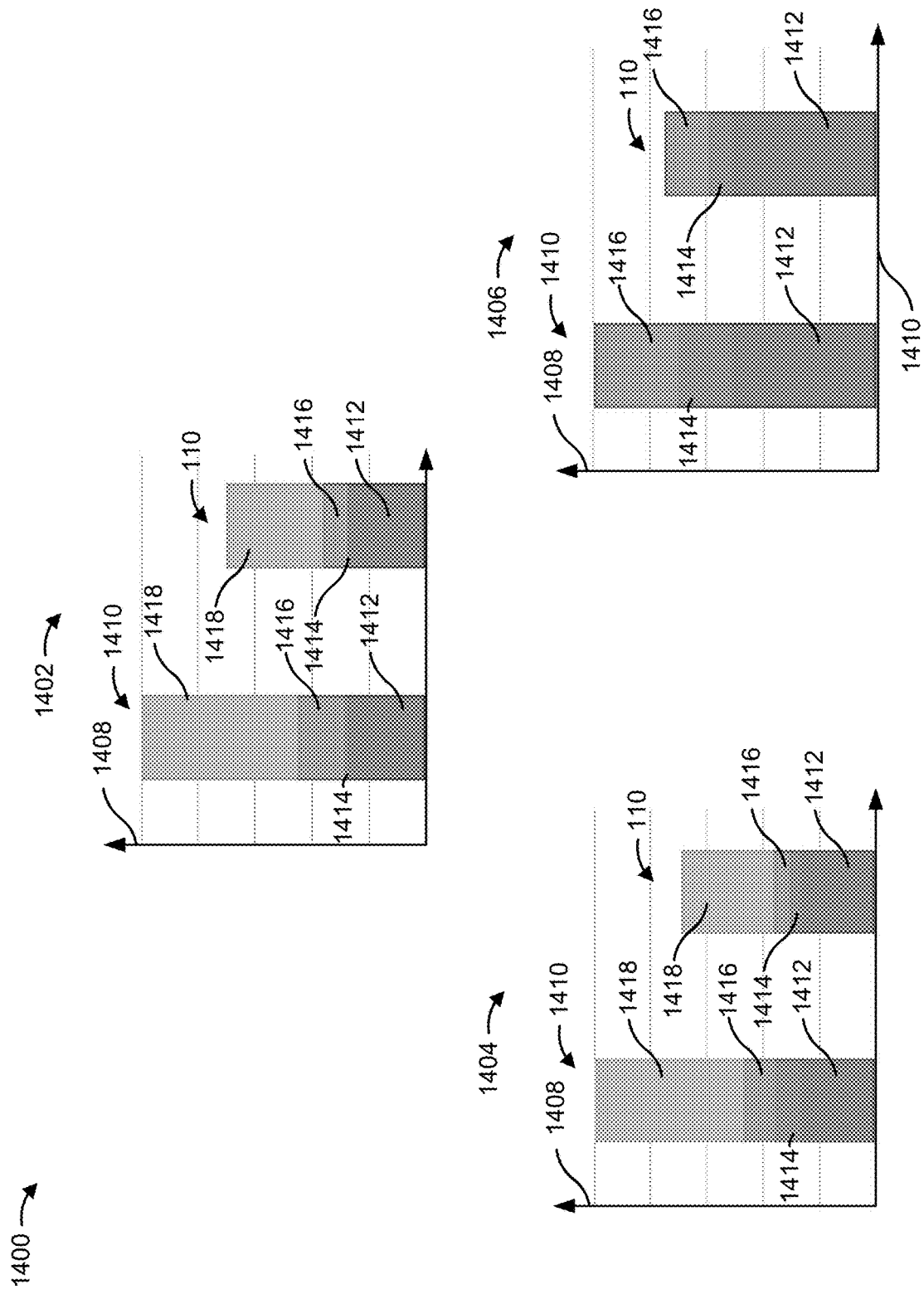
FIG. 14 is a diagram of an example implementation of energy consumption in an AI accelerator device described herein.

FIG. 14 is a diagram of example implementation 1400 of energy consumption in an AI accelerator device 110 described herein. FIG. 14 illustrates an example 1402 of an AI accelerator device 110 that is configured to perform a weight stationary dataflow (e.g., according to the example implementation 1300), an example 1404 of an AI accelerator device 110 that is configured to perform an input stationary dataflow (e.g., according to the example implementation 1308), and an example 1406 of an AI accelerator device 110 that is configured to perform an output stationary dataflow (e.g., according to the example implementation 1316).

In the example 1402, energy consumption 1408 is illustrated for an AI accelerator device 1410 that includes a single monolithic weight buffer, a single monolithic activation buffer, and a single monolithic accumulator buffer. Energy consumption 1408 is also illustrated for an AI accelerator device 110 described herein. The overall energy consumption 1408 may be reduced for an AI accelerator device 110 described herein by including mini buffers for one or more of the weight buffer, the activation buffer, and/or the accumulator buffer of the AI accelerator device 110. In particular, while a compute energy consumption 1412 (e.g., the energy consumption of processing element circuits) remains relatively comparable for the AI accelerator device 1410 and the AI accelerator device 110, a weight buffer energy consumption 1414 may be reduced by including a plurality of weight buffers (such as in the example implementations 200, 500, 600, 800, and/or 900) in the AI accelerator device 110. Additionally and/or alternatively, an activation buffer energy consumption 1416 may be reduced by including a plurality of activation buffers (such as in the example implementations 300, 500, 700, 800, and/or 900) in the AI accelerator device 110. Additionally and/or alternatively, an accumulator buffer energy consumption 1418 may be reduced by including a plurality of accumulator buffers (such as in the example implementations 400, 600, 700, 800, and/or 900) in the AI accelerator device 110.

For the weight stationary dataflow in the example 1402, the energy consumption reduction may be greatest for the activation buffer energy consumption 1416 and for the accumulator buffer energy consumption 1418. Accordingly, the AI accelerator device 110 may be configured to include a plurality of activation buffers and a plurality of accumulator buffers to reduce energy consumption 1408 of the AI accelerator device 110, while including a single monolithic weight buffer to minimize the size or area of the weight buffer. This may correspond to the example implementation 700. However, other implementations described herein may be used instead of the example implementation 700.

In the example 1404, the overall energy consumption 1408 may be reduced for the AI accelerator device 110 described herein for the input buffer dataflow by including mini buffers for one or more of the weight buffer, the activation buffer, and/or the accumulator buffer of the AI accelerator device 110. In particular, while compute energy consumption 1412 (e.g., the energy consumption of processing element circuits) remains relatively comparable for the AI accelerator device 1410 and the AI accelerator device 110, the weight buffer energy consumption 1414 may be reduced by including a plurality of weight buffers (such as in the example implementations 200, 500, 600, 800, and/or 900) in the AI accelerator device 110. Additionally and/or alternatively, the activation buffer energy consumption 1416 may be reduced by including a plurality of activation buffers (such as in the example implementations 300, 500, 700, 800, and/or 900) in the AI accelerator device 110. Additionally and/or alternatively, the accumulator buffer energy consumption 1418 may be reduced by including a plurality of accumulator buffers (such as in the example implementations 400, 600, 700, 800, and/or 900) in the AI accelerator device 110.

For the input stationary dataflow in the example 1404, the energy consumption reduction may be greatest for the accumulator buffer energy consumption 1418. Accordingly, the AI accelerator device 110 may be configured to include a plurality of accumulator buffers to reduce energy consumption 1408 of the AI accelerator device 110, while including a single monolithic weight buffer and a single monolithic activation buffer to minimize the size or area of the weight buffer and the activation buffer. This may correspond to the example implementation 400. However, other implementations described herein may be used instead of the example implementation 400.

In the example 1406, the overall energy consumption 1408 may be reduced for the AI accelerator device 110 described herein for the output buffer dataflow by including mini buffers for the weight buffer and/or the activation buffer of the AI accelerator device 110. In particular, while compute energy consumption 1412 (e.g., the energy consumption of processing element circuits) remains relatively comparable for the AI accelerator device 1410 and the AI accelerator device 110, the weight buffer energy consumption 1414 may be reduced by including a plurality of weight buffers (such as in the example implementations 200, 500, 600, 800, and/or 900) in the AI accelerator device 110. Additionally and/or alternatively, the activation buffer energy consumption 1416 may be reduced by including a plurality of activation buffers (such as in the example implementations 300, 500, 700, 800, and/or 900) in the AI accelerator device 110.

For the output stationary dataflow in the example 1406, the energy consumption reduction may be greatest for the activation buffer energy consumption 1416. Accordingly, the AI accelerator device 110 may be configured to include a plurality of activation buffers to reduce energy consumption 1408 of the AI accelerator device 110, while including a single monolithic weight buffer and a single monolithic accumulator buffer to minimize the size or area of the weight buffer and the accumulator buffer. This may correspond to the example implementation 300. However, other implementations described herein may be used instead of the example implementation 300.

As indicated above, FIG. 14 is provided as an example. Other examples may differ from what is described with regard to FIG. 14.

Figure 15A:
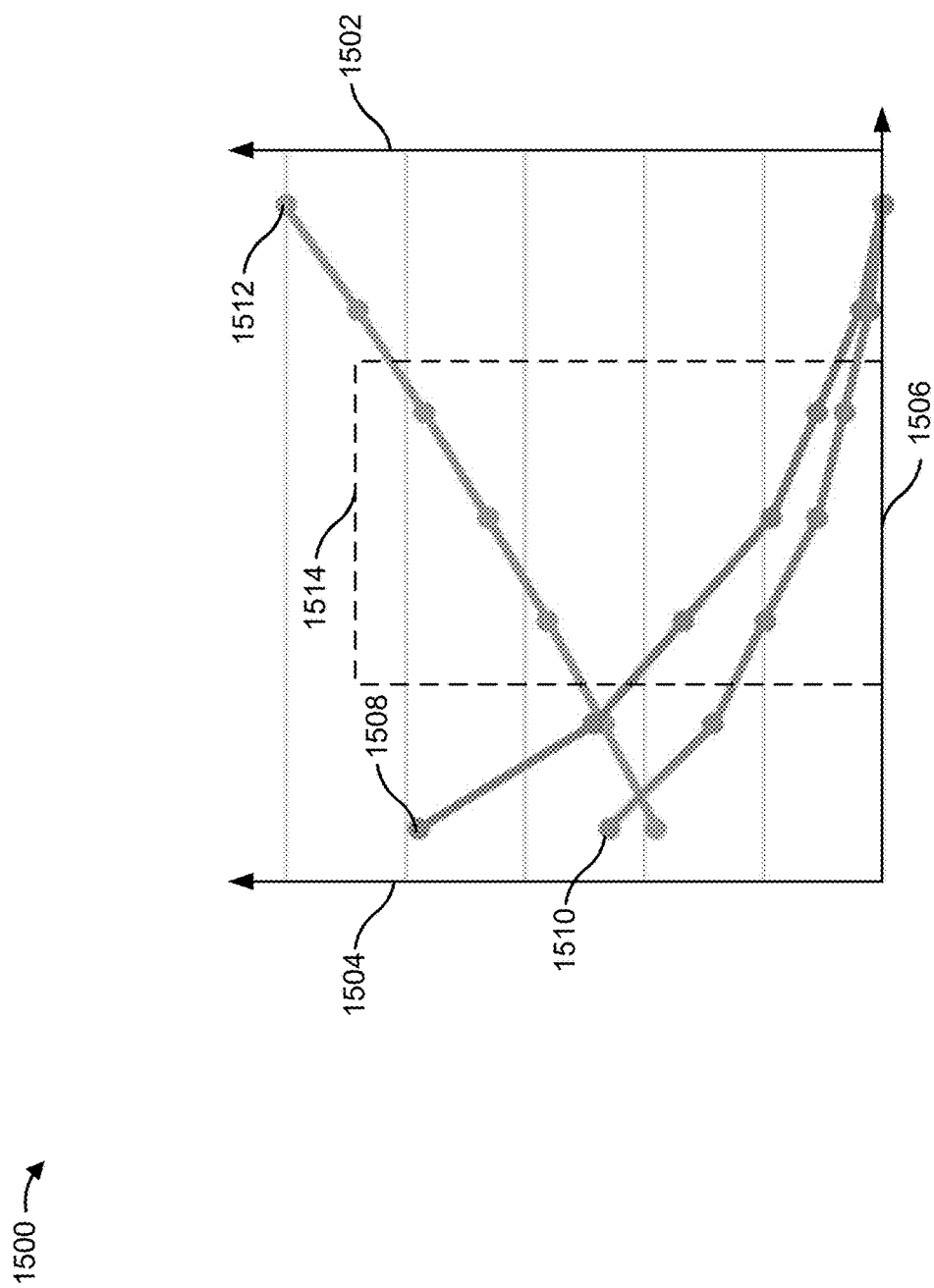
FIGS. 15A and 15B are diagrams of an example implementations of design parameters for an AI accelerator device described herein.
Figure 15B:
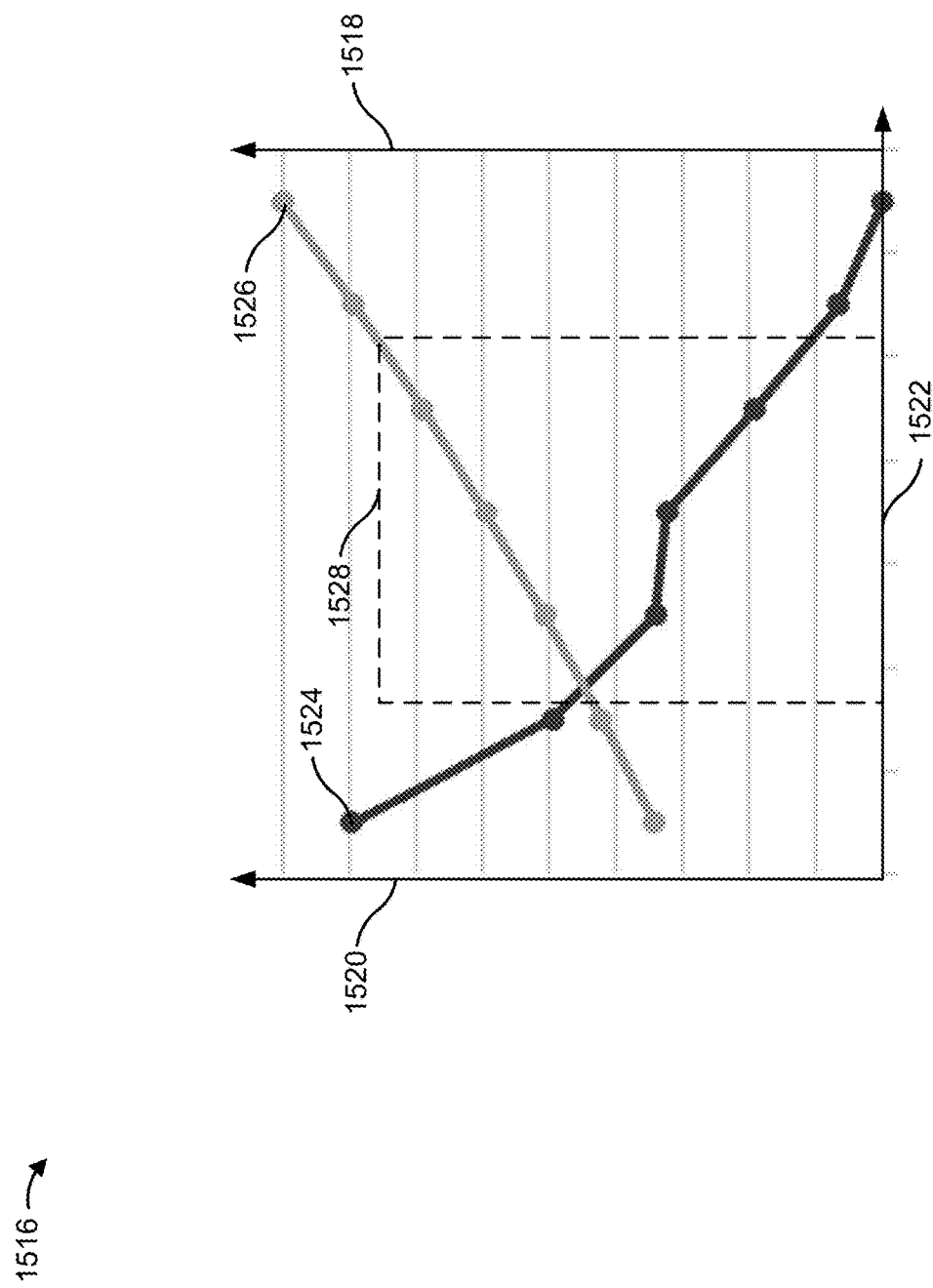

FIGS. 15A and 15B are diagrams of example implementations of design parameters for an AI accelerator device 110 described herein.

FIG. 15A illustrates an example implementation 1500 of design parameters including normalized area 1502 and normalized energy 1504 as a function of processing element density 1506 in a buffer (e.g., quantity of processing element circuits assigned to a single buffer, such as a weight buffer, an activation buffer, an accumulator buffer).

As shown in FIG. 15A, read energy 1508 and write energy 1510 decrease as processing element density 1506 in a buffer decreases, meaning that read energy 1508 and write energy 1510 is generally lower for a buffer that is assigned to a lesser quantity of processing element circuits. Accordingly, increasing the quantity of buffers (e.g., the quantity of weight buffers, the quantity of activation buffers, and/or the quantity of accumulator buffers) in an AI accelerator device 110 described herein such that each buffer is assigned to fewer processing element circuits may reduce read energy 1508 and write energy 1510 in the AI accelerator device 110. However, buffer area 1512 increases as the processing element density 1506 in a buffer also increases. Accordingly, the buffers in an AI accelerator device 110 described herein may be configured such that the processing element density 1506, the read energy 1508, the write energy 1510, and the buffer area 1512 of the buffers falls within an optimization window 1514.

FIG. 15B illustrates an example implementation 1516 of design parameters including normalized area 1518 and normalized latency 1520 as a function of processing element density 1522 in a buffer (e.g., quantity of processing element circuits assigned to a single buffer, such as a weight buffer, an activation buffer, an accumulator buffer).

As shown in FIG. 15B, buffer latency 1524 decreases as processing element density 1522 in a buffer decreases, meaning that buffer latency 1524 is generally lower for a buffer that is assigned to a lesser quantity of processing element circuits. Accordingly, increasing the quantity of buffers (e.g., the quantity of weight buffers, the quantity of activation buffers, and/or the quantity of accumulator buffers) in an AI accelerator device 110 described herein such that each buffer is assigned to fewer processing element circuits may reduce buffer latency 1524 in the AI accelerator device 110. However, buffer area 1526 increases as the processing element density 1522 in a buffer also increases. Accordingly, the buffers in an AI accelerator device 110 described herein may be configured such that the processing element density 1522, the buffer latency 1524, and the buffer area 1526 of the buffers falls within an optimization window 1528.

As indicated above, FIGS. 15A and 15B is provided as an example. Other examples may differ from what is described with regard to FIGS. 15A and 15B.

FIG. 16 is a diagram of example components of a device 1600 described herein. Device 1600 may correspond to one or more components included in the edge computing system 101 and/or one or more of the client devices 130-170. In some implementations, one or more components included in the edge computing system 101 and/or one or more of the client devices 130-170 may include one or more devices 1600 and/or one or more components of device 1600. As shown in FIG. 16, device 1600 may include a bus 1610, a processor 1620, a memory 1630, an input component 1640, an output component 1650, and a communication component 1660.

Bus 1610 may include one or more components that enable wired and/or wireless communication among the components of device 1600. Bus 1610 may couple together two or more components of FIG. 16, such as via operative coupling, communicative coupling, electronic coupling, and/or electric coupling. Processor 1620 may include a central processing unit, a graphics processing unit, a microprocessor, a controller, a microcontroller, a digital signal processor, a field-programmable gate array, an application-specific integrated circuit, and/or another type of processing component. Processor 1620 is implemented in hardware, firmware, or a combination of hardware and software. In some implementations, processor 1620 may include one or more processors capable of being programmed to perform one or more operations or processes described elsewhere herein.

Memory 1630 may include volatile and/or nonvolatile memory. For example, memory 1630 may include random access memory (RAM), read only memory (ROM), a hard disk drive, and/or another type of memory (e.g., a flash memory, a magnetic memory, and/or an optical memory). Memory 1630 may include internal memory (e.g., RAM, ROM, or a hard disk drive) and/or removable memory (e.g., removable via a universal serial bus connection). Memory 1630 may be a non-transitory computer-readable medium. Memory 1630 stores information, instructions, and/or software (e.g., one or more software applications) related to the operation of device 1600. In some implementations, memory 1630 may include one or more memories that are coupled to one or more processors (e.g., processor 1620), such as via bus 1610.

Input component 1640 enables device 1600 to receive input, such as user input and/or sensed input. For example, input component 1640 may include a touch screen, a keyboard, a keypad, a mouse, a button, a microphone, a switch, a sensor, a global positioning system sensor, an accelerometer, a gyroscope, and/or an actuator. Output component 1650 enables device 1600 to provide output, such as via a display, a speaker, and/or a light-emitting diode.

Communication component 1660 enables device 1600 to communicate with other devices via a wired connection and/or a wireless connection. For example, communication component 1660 may include a receiver, a transmitter, a transceiver, a modem, a network interface card, and/or an antenna.

Device 1600 may perform one or more operations or processes described herein. For example, a non-transitory computer-readable medium (e.g., memory 1630) may store a set of instructions (e.g., one or more instructions or code) for execution by processor 1620. Processor 1620 may execute the set of instructions to perform one or more operations or processes described herein. In some implementations, execution of the set of instructions, by one or more processors 1620, causes the one or more processors 1620 and/or the device 1600 to perform one or more operations or processes described herein. In some implementations, hardwired circuitry is used instead of or in combination with the instructions to perform one or more operations or processes described herein. Additionally, or alternatively, processor 1620 may be configured to perform one or more operations or processes described herein. Thus, implementations described herein are not limited to any specific combination of hardware circuitry and software.

The number and arrangement of components shown in FIG. 16 are provided as an example. Device 1600 may include additional components, fewer components, different components, or differently arranged components than those shown in FIG. 16. Additionally, or alternatively, a set of components (e.g., one or more components) of device 1600 may perform one or more functions described as being performed by another set of components of device 1600.

Figure 17:
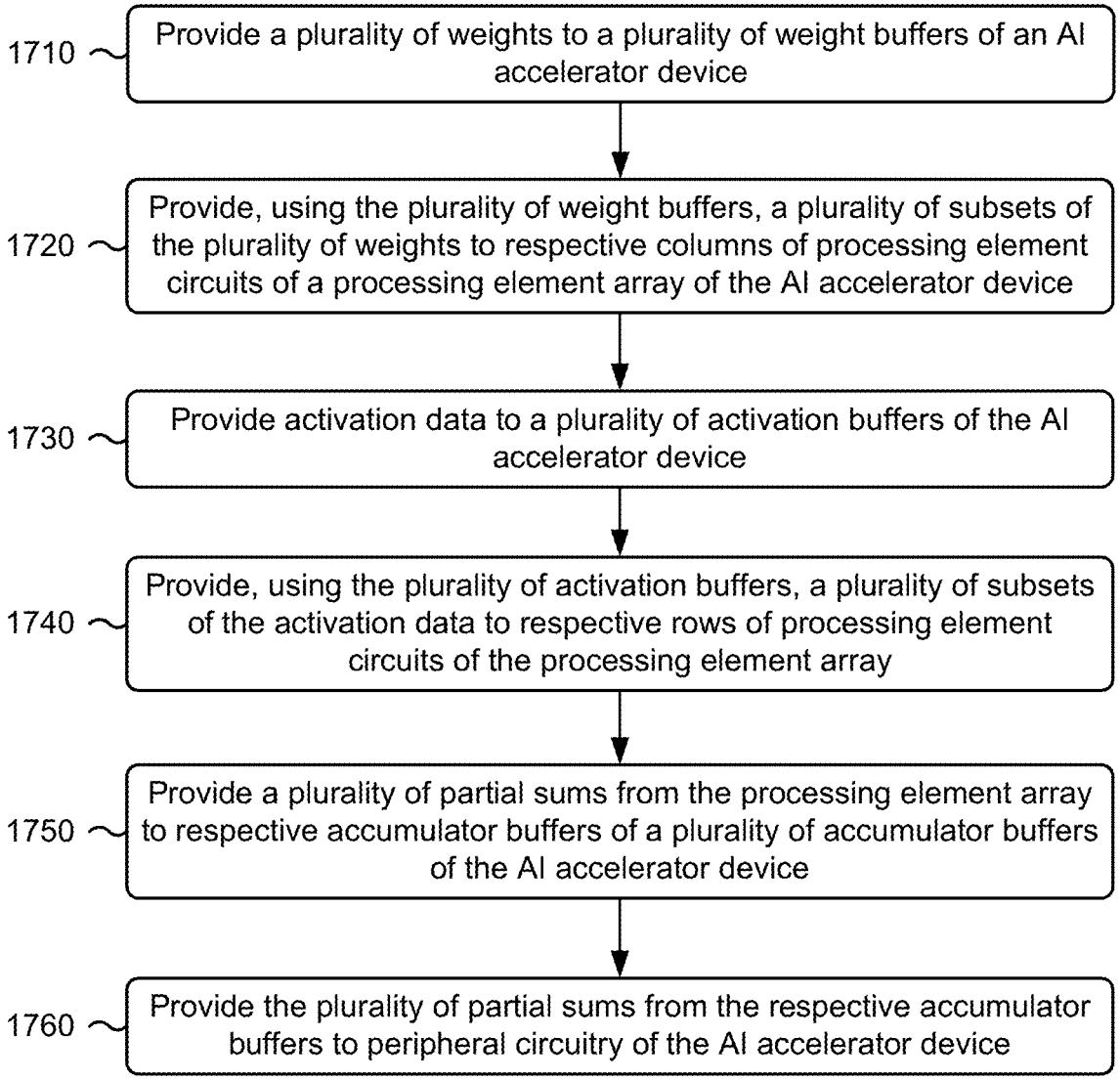
FIG. 17 is a flowchart of an example process associated with operation of an AI accelerator device described herein.

FIG. 17 is a flowchart of an example process 1700 associated with operation of an AI accelerator device described herein. In some implementations, one or more process blocks of FIG. 17 are performed by an AI accelerator device (e.g., the AI accelerator device 110).

As shown in FIG. 17, process 1700 may include providing a plurality of weights to a plurality of weight buffers of the AI accelerator device (block 1710). For example, the AI accelerator device 110 may provide a plurality of weights to a plurality of weight buffers (e.g., weight buffers 810a-810k, weight buffers 910a-910k) of the AI accelerator device 110, as described herein.

As further shown in FIG. 17, process 1700 may include providing, using the plurality of weight buffers, a plurality of subsets of the plurality of weights to respective columns of processing element circuits of a processing element array of the AI accelerator device (block 1720). For example, the AI accelerator device 110 may provide, using the plurality of weight buffers, a plurality of subsets of the plurality of weights to respective columns (e.g., columns 806a-806l, columns 906a-906l) of processing element circuits (e.g., processing element circuits 804a-804n, processing element circuits 904) of a processing element array (e.g., processing element array 802, processing element array 902) of the AI accelerator device 110, as described herein.

As further shown in FIG. 17, process 1700 may include providing activation data to a plurality of activation buffers of the AI accelerator device (block 1730). For example, the AI accelerator device 110 may provide activation data to a plurality of activation buffers (e.g., activation buffers 818a-818x, activation buffers 918a-918x) of the AI accelerator device, as described herein.

As further shown in FIG. 17, process 1700 may include providing, using the plurality of activation buffers, a plurality of subsets of the activation data to respective rows of processing element circuits of the processing element array (block 1740). For example, the AI accelerator device 110 may provide, using the plurality of activation buffers, a plurality of subsets of the activation data to respective rows (e.g., rows 808a-808m, rows 908a-908m) of processing element circuits of the processing element array, as described herein.

As further shown in FIG. 17, process 1700 may include providing a plurality of partial sums from the processing element array to respective accumulator buffers of a plurality of accumulator buffers of the AI accelerator device (block 1750). For example, the AI accelerator device 110 may provide a plurality of partial sums from the processing element array to respective accumulator buffers (e.g., accumulator buffers 820a-820y, accumulator buffers 920a-920y) of a plurality of accumulator buffers of the AI accelerator device, as described herein. In some implementations, the plurality of partial sums are based on a MAC operation performed by the processing element array on the plurality of weights and the activation data.

As further shown in FIG. 17, process 1700 may include providing the plurality of partial sums from the respective accumulator buffers to peripheral circuitry of the AI accelerator device (block 1760). For example, the AI accelerator device 110 may provide the plurality of partial sums from the respective accumulator buffers to peripheral circuitry (e.g., peripheral circuitry 822, peripheral circuitry 922) of the AI accelerator device 110, as described herein.

Process 1700 may include additional implementations, such as any single implementation or any combination of implementations described below and/or in connection with one or more other processes described elsewhere herein.

In a first implementation, providing the plurality of weights to the plurality of weight buffers includes providing the plurality of weights from a memory device (e.g., memory device 814, memory device 914) of the AI accelerator device 110 to the plurality of weight buffers through a weight buffer multiplexer circuit (e.g., weight buffer multiplexer circuit 812, weight buffer multiplexer circuit 912), and the process 1700 includes generating a select signal, and providing the select signal to the weight buffer multiplexer circuit to cause the weight buffer multiplexer circuit to provide the plurality of weights to the plurality of weight buffers.

In a second implementation, along or in combination with the first implementation, providing the activation data to the plurality of activation buffers includes providing the activation data from peripheral circuitry (e.g., peripheral circuitry 822, peripheral circuitry 922) of the AI accelerator device 110 to the plurality of activation buffers through an activation buffer multiplexer circuit (e.g., activation buffer multiplexer circuit 824, activation buffer multiplexer circuit 924), and process 1700 includes generating a select signal, and providing the select signal to the activation buffer multiplexer to cause the activation buffer multiplexer to provide the activation data to the plurality of activation buffers.

In a third implementation, along or in combination with the first or second implementation, the plurality of partial sums include a plurality of updated partial sums, and wherein the activation data comprises a plurality of input partial sums, and inputting data to be multiplied with the plurality of weights and accumulated with the plurality of input partial sums to form the updated partial sums. In a fourth implementation, alone or in combination with one or more of the first through third implementations, process 1700 includes providing the plurality of input partial sums from the peripheral circuitry to the activation buffer multiplexer circuit. In a fifth implementation, alone or in combination with one or more of the first through fourth implementations, providing the plurality of partial sums from the processing element array to the respective accumulator buffers includes providing the plurality of partial sums from the respective columns of processing element circuits of the processing element array to the respective accumulator buffers.

Although FIG. 17 shows example blocks of process 1700, in some implementations, process 1700 includes additional blocks, fewer blocks, different blocks, or differently arranged blocks than those depicted in FIG. 17. Additionally, or alternatively, two or more of the blocks of process 1700 may be performed in parallel.

In this way, an AI accelerator device may include a plurality of on-chip mini buffer that are associated with a PE array. Each mini buffer is associated with a subset of rows or a subset of columns of the PE array. Partitioning an on-chip buffer of the AI accelerator device into the mini buffers described herein may reduce the size and complexity of the on-chip buffer. The reduced size of the on-chip buffer may reduce the wire routing complexity of the on-chip buffer, which may reduce latency and may reduce access energy for the AI accelerator device. This may increase the operating efficiency and/or may increase the performance of the AI accelerator device. Moreover, the mini buffers may increase the overall bandwidth that is available for the mini buffers to transfer data to and from the PE array. As described in greater detail above, some implementations described herein provide an AI accelerator device. The AI accelerator device includes a processing element array, including a plurality of columns of processing element circuits a plurality of rows of processing element circuits. The AI accelerator device includes a plurality of weight buffers associated with the processing element array, where the plurality of weight buffers are associated with respective subsets of columns of the plurality of columns of processing element circuits of the processing element array.

As described in greater detail above, some implementations described herein provide an AI accelerator device. The AI accelerator device includes a processing element array, including a plurality of columns of processing element circuits a plurality of rows of processing element circuits. The AI accelerator device includes a plurality of activation buffers associated with the processing element array, where the plurality of activation buffers are associated with a respective subset of rows of the plurality of rows of processing element circuits of the processing element array.

As described in greater detail above, some implementations described herein provide a method. The method includes providing, by an AI accelerator device, a plurality of weights to a plurality of weight buffers of the AI accelerator device. The method includes providing, by the AI accelerator device and using the plurality of weight buffers, a plurality of subsets of the plurality of weights to respective columns of processing element circuits of a processing element array of the AI accelerator device. The method includes providing, by the AI accelerator device, activation data to a plurality of activation buffers of the AI accelerator device. The method includes providing, by the AI accelerator device and using the plurality of activation buffers, a plurality of subsets of the activation data to respective rows of processing element circuits of the processing element array. The method includes providing, by the AI accelerator device, a plurality of partial sums from the processing element array to respective accumulator buffers of a plurality of accumulator buffers of the AI accelerator device, where the plurality of partial sums are based on a MAC operation performed by the processing element array on the plurality of weights and the activation data. The method includes providing, by the AI accelerator device, the plurality of partial sums from the respective accumulator buffers to peripheral circuitry of the AI accelerator device.

The foregoing outlines features of several embodiments so that those skilled in the art may better understand the aspects of the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions, and alterations herein without departing from the spirit and scope of the present disclosure.

What is claimed is:

1. An artificial intelligence (AI) accelerator device, comprising:
   a processing element array, comprising:
     a plurality of columns of processing element circuits; and
     a plurality of rows of processing element circuits;
   a plurality of weight buffers associated with the processing element array,
     wherein the plurality of weight buffers are associated with respective subsets of columns of the plurality of columns of processing element circuits of the processing element array; and
   a weight buffer multiplexer circuit coupled with each weight buffer of the plurality of weight buffers.

2. The AI accelerator device of claim 1, further comprising:
   a memory device,
     wherein the memory device is coupled with the plurality of weight buffers by the weight buffer multiplexer circuit.

3. The AI accelerator device of claim 1, further comprising:
a plurality of activation buffers associated with the processing element array,
wherein the plurality of activation buffers are associated with respective subsets of rows of the plurality of rows of processing element circuits of the processing element array.

4. The AI accelerator device of claim 3, further comprising:
an activation buffer multiplexer circuit coupled with the plurality of activation buffers; and
a distributor circuit coupled with the activation buffer multiplexer circuit.

5. The AI accelerator device of claim 4,
wherein the distributor circuit is coupled with the weight buffer multiplexer circuit.

6. The AI accelerator device of claim 4, further comprising:
a plurality of accumulator buffers associated with the processing element array,
wherein the plurality of accumulator buffers are associated with a respective subset of columns of the plurality of columns of processing element circuits of the processing element array.

7. The AI accelerator device of claim 6, wherein the plurality of accumulator buffers are coupled with the activation buffer multiplexer circuit by peripheral circuitry of the AI accelerator device.

8. An artificial intelligence (AI) accelerator device, comprising:
a processing element array, comprising:
a plurality of columns of processing element circuits; and
a plurality of rows of processing element circuits;
a plurality of activation buffers associated with the processing element array,
wherein each activation buffer, of the plurality of activation buffers, is associated with a respective row of the plurality of rows of processing element circuits of the processing element array;
a plurality of weight buffers associated with the processing element array; and
a weight buffer multiplexer circuit coupled with each weight buffer of the plurality of weight buffers.

9. The AI accelerator device of claim 8, further comprises:
an activation buffer multiplexer circuit coupled with each activation buffer of the plurality of activation buffers.

10. The AI accelerator device of claim 8, further comprising:
an activation buffer multiplexer circuit coupled with the plurality of activation buffers;
a distributor circuit coupled with the activation buffer multiplexer circuit; and
a plurality of accumulator buffers associated with the processing element array,
wherein the plurality of accumulator buffers are associated with a respective subset of columns of the plurality of columns of processing element circuits of the processing element array.

11. The AI accelerator device of claim 10, wherein the plurality of accumulator buffers are coupled with the activation buffer multiplexer circuit by peripheral circuitry of the AI accelerator device.

12. The AI accelerator device of claim 10, wherein the AI accelerator device is configured to perform an input stationary dataflow; and wherein a quantity of the plurality of accumulator buffers is greater relative to a quantity of the plurality of activation buffers.

13. The AI accelerator device of claim 8, wherein the AI accelerator device is configured to perform an output stationary dataflow; and
wherein the AI accelerator device comprises a monolithic accumulator buffer.

14. A method, comprising:
providing, by an artificial intelligence (AI) accelerator device, a plurality of weights to a plurality of weight buffers of the AI accelerator device;
providing, by the AI accelerator device and using the plurality of weight buffers, a plurality of subsets of the plurality of weights to respective columns of processing element circuits of a processing element array of the AI accelerator device;
providing, by the AI accelerator device, activation data to a plurality of activation buffers of the AI accelerator device;
providing, by the AI accelerator device and using the plurality of activation buffers, a plurality of subsets of the activation data to a plurality of rows of processing element circuits of the processing element array,
wherein each subset of the activation data is provided, using a respective activation buffer of the plurality of activation buffers, to a respective row of the plurality of rows of processing element circuits;
providing, by the AI accelerator device, a plurality of partial sums from the processing element array to respective accumulator buffers of a plurality of accumulator buffers of the AI accelerator device,
wherein the plurality of partial sums are based on a multiply and accumulate (MAC) operation performed by the processing element array on the plurality of weights and the activation data; and
providing, by the AI accelerator device, the plurality of partial sums from the respective accumulator buffers to peripheral circuitry of the AI accelerator device.

15. The method of claim 14, wherein providing the plurality of weights to the plurality of weight buffers comprises:
providing the plurality of weights from a memory device of the AI accelerator device to the plurality of weight buffers through a weight buffer multiplexer circuit.

16. The method of claim 15, further comprising:
generating, by a distributor circuit of the AI accelerator device, a select signal; and
providing the select signal to the weight buffer multiplexer circuit to cause the weight buffer multiplexer circuit to provide the plurality of weights to the plurality of weight buffers.

17. The method of claim 15, wherein providing the activation data to the plurality of activation buffers comprises:
providing the activation data from peripheral circuitry of the AI accelerator device to the plurality of activation buffers through an activation buffer multiplexer circuit; and
wherein the method further comprises:
generating, by a distributor circuit of the AI accelerator device, a select signal; and
providing the select signal to the activation buffer multiplexer circuit to cause the activation buffer multiplexer circuit to provide the activation data to the plurality of activation buffers.

18. The method of claim 17, wherein the plurality of partial sums comprise a plurality of updated partial sums; and
wherein the activation data comprises:
a plurality of input partial sums; and
input data to be multiplied with the plurality of weights and accumulated with the plurality of input partial sums to form the updated partial sums.

19. The method of claim 18, further comprising:
providing the plurality of input partial sums from the peripheral circuitry to the activation buffer multiplexer circuit.

20. The method of claim 15, wherein providing the plurality of partial sums from the processing element array to the respective accumulator buffers comprises:
providing the plurality of partial sums from the respective columns of processing element circuits of the processing element array to the respective accumulator buffers.

* * * * *